United States Patent
Abedini et al.

(10) Patent No.: US 11,936,503 B2
(45) Date of Patent: Mar. 19, 2024

(54) TECHNIQUES FOR ADDING PILOTS TO A FORWARDED SIGNAL BY A REPEATER NODE

(71) Applicant: QUALCOMM Incorporated, San Diego, CA (US)

(72) Inventors: Navid Abedini, Basking Ridge, NJ (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 17/387,610

(22) Filed: Jul. 28, 2021

(65) Prior Publication Data

US 2022/0045882 A1     Feb. 10, 2022

Related U.S. Application Data

(60) Provisional application No. 62/706,183, filed on Aug. 4, 2020, provisional application No. 62/706,182, filed on Aug. 4, 2020.

(51) Int. Cl.
*H04W 72/12*     (2023.01)
*H04B 7/155*     (2006.01)
*H04B 17/309*    (2015.01)
*H04L 5/00*      (2006.01)
*H04L 25/02*     (2006.01)
*H04W 72/23*     (2023.01)

(52) U.S. Cl.
CPC ........ *H04L 25/0224* (2013.01); *H04L 5/0048* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2008/0227386 A1* | 9/2008 | Dayal | H04L 1/0026 455/7 |
| 2009/0010215 A1* | 1/2009 | Kim | H04B 7/15592 370/329 |
| 2010/0150034 A1* | 6/2010 | Song | H04B 7/2606 370/279 |
| 2011/0110261 A1 | 5/2011 | Frenger | |
| 2011/0116531 A1* | 5/2011 | Gore | H04B 7/15585 375/213 |

(Continued)

FOREIGN PATENT DOCUMENTS

EP     1850509 A1     10/2007

OTHER PUBLICATIONS

International Search Report and Written Opinion—PCT/US2021/071042—ISA/EPO—dated Nov. 19, 2021.

*Primary Examiner* — Duc T Duong
(74) *Attorney, Agent, or Firm* — Dalei Dong; Harrity & Harrity, LLP

(57) ABSTRACT

Various aspects of the present disclosure generally relate to wireless communication. In some aspects, a repeater node may receive a first signal to be forwarded to a receiver node or a control node. The repeater node may generate a second signal that includes repeater node pilots and the first signal to be forwarded to the receiver node or the control node. The repeater node may transmit, to the receiver node or the control node, the second signal. Numerous other aspects are provided.

20 Claims, 20 Drawing Sheets

(56) References Cited

U.S. PATENT DOCUMENTS

| | | | |
|---|---|---|---|
| 2011/0217921 A1* | 9/2011 | Larsson | H04W 72/542 |
| | | | 455/7 |
| 2012/0014417 A1* | 1/2012 | Heath, Jr. | H04W 52/325 |
| | | | 375/259 |
| 2012/0127888 A1* | 5/2012 | Fujishima | H04W 72/542 |
| | | | 370/252 |
| 2013/0265896 A1 | 10/2013 | Mallik et al. | |
| 2013/0315133 A1* | 11/2013 | Wang | H04W 40/22 |
| | | | 370/315 |
| 2014/0355512 A1* | 12/2014 | Bae | H04W 16/26 |
| | | | 370/315 |
| 2015/0146872 A1* | 5/2015 | Baek | G06F 11/08 |
| | | | 380/270 |
| 2015/0236833 A1* | 8/2015 | Dayal | H04L 5/0051 |
| | | | 370/315 |
| 2016/0134438 A1* | 5/2016 | Marzetta | H04L 25/0228 |
| | | | 370/315 |
| 2017/0163452 A1* | 6/2017 | Breiling | H04L 25/0224 |
| 2017/0201394 A1* | 7/2017 | Lin | H04L 25/0224 |
| 2018/0115448 A1* | 4/2018 | Ramanujam | H04J 3/0605 |
| 2020/0403689 A1* | 12/2020 | Rofougaran | H04W 52/245 |

\* cited by examiner

TECHNIQUES FOR ADDING PILOTS TO A FORWARDED SIGNAL BY A REPEATER NODE

CROSS-REFERENCE TO RELATED APPLICATION

This Patent Application claims priority to U.S. Provisional Patent Application No. 62/706,182, filed on Aug. 4, 2020, entitled "TECHNIQUES FOR ADDING PILOTS TO A FORWARDED SIGNAL BY A REPEATER NODE," and assigned to the assignee hereof. This Patent Application also claims priority to U.S. Provisional Patent Application No. 62/706,183, filed on Aug. 4, 2020, entitled "TECHNIQUES FOR ADDING REPEATER NODE PILOTS TO A SIGNAL TO BE FORWARDED BY A REPEATER NODE," and assigned to the assignee hereof. The disclosures of the prior Applications are considered part of and are incorporated by reference in this Patent Application.

FIELD OF THE DISCLOSURE

Aspects of the present disclosure generally relate to wireless communication and to techniques and apparatuses for adding pilots to a forwarded signal by a repeater node.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a repeater node. The method may include receiving a first signal to be forwarded to a receiver node or a control node. The method may include generating a second signal that includes repeater node pilots and the first signal to be forwarded to the receiver node or the control node. The method may include transmitting, to the receiver node or the control node, the second signal.

Some aspects described herein relate to a method of wireless communication performed by a control node. The method may include determining, for a repeater node, a configuration for generation of a second signal that includes repeater node pilots and a first signal to be forwarded to a receiver node or the control node. The method may include transmitting, to the repeater node, an indication of the configuration.

Some aspects described herein relate to a method of wireless communication performed by a receiver node. The method may include receiving, from a repeater node, a second signal that includes a first signal with repeater node pilots. The method may include determining a channel estimate of a transmission channel of the repeater node based at least in part on the repeater node pilots.

Some aspects described herein relate to a repeater node for wireless communication. The repeater node may include a memory and one or more processors coupled to the memory. The one or more processors may be configured to receive a first signal to be forwarded to a receiver node or a control node. The one or more processors may be configured to generate a second signal that includes repeater node pilots and the first signal to be forwarded to the receiver node or the control node. The one or more processors may be configured to transmit, to the receiver node or the control node, the second signal.

Some aspects described herein relate to a control node for wireless communication. The control node may include a memory and one or more processors coupled to the memory. The one or more processors may be configured to transmit, to a repeater node, an indication of a configuration for generation of a second signal that includes repeater node pilots and a first signal to be forwarded to a receiver node or the control node. The one or more processors may be configured to determine a channel estimate of a transmission channel of the repeater node based at least in part on the repeater node pilots.

Some aspects described herein relate to a receiver node for wireless communication. The receiver node may include a memory and one or more processors coupled to the memory. The one or more processors may be configured to receive, from a repeater node, a second signal that includes a first signal with repeater node pilots. The one or more processors may be configured to determine a channel estimate of a transmission channel of the repeater node based at least in part on the repeater node pilots.

Some aspects described herein relate to a non-transitory computer-readable medium that stores a set of instructions for wireless communication by a repeater node. The set of instructions, when executed by one or more processors of the repeater node, may cause the repeater node to receive a first signal to be forwarded to a receiver node or a control node. The set of instructions, when executed by one or more processors of the repeater node, may cause the repeater node to generate a second signal that includes repeater node pilots and the first signal to be forwarded to the receiver node or the control node. The set of instructions, when executed by one or more processors of the repeater node, may cause the repeater node to transmit, to the receiver node or the control node, the second signal.

Some aspects described herein relate to a non-transitory computer-readable medium that stores a set of instructions for wireless communication by a control node. The set of instructions, when executed by one or more processors of the control node, may cause the control node to transmit, to a repeater node, an indication of a configuration for generation of a second signal that includes repeater node pilots and a first signal to be forwarded to a receiver node or the control node. The set of instructions, when executed by one or more processors of the control node, may cause the control node to determine a channel estimate of a transmission channel of the repeater node based at least in part on the repeater node pilots.

Some aspects described herein relate to a non-transitory computer-readable medium that stores a set of instructions for wireless communication by a receiver node. The set of instructions, when executed by one or more processors of the receiver node, may cause the receiver node to receive, from a repeater node, a second signal that includes a first signal with repeater node pilots. The set of instructions, when executed by one or more processors of the receiver node, may cause the receiver node to determine a channel estimate of a transmission channel of the repeater node based at least in part on the repeater node pilots.

Some aspects described herein relate to an apparatus for wireless communication. The apparatus may include means for receiving a first signal to be forwarded to a receiver node or a control node. The apparatus may include means for generating a second signal that includes repeater node pilots and the first signal to be forwarded to the receiver node or the control node. The apparatus may include means for transmitting, to the receiver node or the control node, the second signal.

Some aspects described herein relate to an apparatus for wireless communication. The apparatus may include means for transmitting, to a repeater node, an indication of a configuration for generation of a second signal that includes repeater node pilots and a first signal to be forwarded to a receiver node or the apparatus. The apparatus may include means for determining a channel estimate of a transmission channel of the repeater node based at least in part on the repeater node pilots.

Some aspects described herein relate to an apparatus for wireless communication. The apparatus may include means for receiving, from a repeater node, a second signal that includes a first signal with repeater node pilots. The apparatus may include means for determining a channel estimate of a transmission channel of the repeater node based at least in part on the repeater node pilots.

Some aspects described herein relate to a method of wireless communication performed by a transmitter node. The method may include determining, by the transmitter node, repeater node pilots associated with a repeater node. The method may include generating a first signal based at least in part on the repeater node pilots and a second signal, the second signal for forwarding by the repeater node to a receiver node and the repeater node pilots for determination of a reception channel of the repeater node. The method may include transmitting, to the repeater node, the first signal.

Some aspects described herein relate to a method of wireless communication performed by a control node. The method may include determining, for a repeater node, a configuration for reception of a first signal that includes repeater node pilots and a second signal, the second signal for forwarding by the repeater node to a received node. The method may include transmitting, to the repeater node, an indication of the configuration.

Some aspects described herein relate to a method of wireless communication performed by a repeater node. The method may include receiving, from a transmitter node or a control node, a first signal that includes a second signal and repeater node pilots, the second signal for forwarding to a receiver node. The method may include measuring the repeater node pilots to obtain one or more of a measurement value or a channel estimation of a reception channel of the repeater node. The method may include transmitting the second signal to the receiver node.

Some aspects described herein relate to a transmitter node for wireless communication. The transmitter node may include a memory and one or more processors coupled to the memory. The one or more processors may be configured to determine repeater node pilots associated with a repeater node. The one or more processors may be configured to generate a first signal based at least in part on the repeater node pilots and a second signal, the second signal for forwarding by the repeater node to a receiver node and the repeater node pilots for determination of a reception channel of the repeater node. The one or more processors may be configured to transmit, to the repeater node, the first signal.

Some aspects described herein relate to a control node for wireless communication. The control node may include a memory and one or more processors coupled to the memory. The one or more processors may be configured to determine, for a repeater node, a configuration for reception of a first signal that includes repeater node pilots and a second signal, the second signal for forwarding by the repeater node to a received node. The one or more processors may be configured to transmit, to the repeater node, an indication of the configuration.

Some aspects described herein relate to a repeater node for wireless communication. The repeater node may include a memory and one or more processors coupled to the memory. The one or more processors may be configured to receive, from a transmitter node or a control node, a first signal that includes a second signal and repeater node pilots, the second signal for forwarding to a receiver node. The one or more processors may be configured to measure the repeater node pilots to obtain one or more of a measurement value or a channel estimation of a reception channel of the repeater node. The one or more processors may be configured to transmit the second signal to the receiver node.

Some aspects described herein relate to a non-transitory computer-readable medium that stores a set of instructions for wireless communication by a transmitter node. The set of instructions, when executed by one or more processors of the transmitter node, may cause the transmitter node to determine repeater node pilots associated with a repeater node. The set of instructions, when executed by one or more processors of the transmitter node, may cause the transmitter node to generate a first signal based at least in part on the repeater node pilots and a second signal, the second signal for forwarding by the repeater node to a receiver node and the repeater node pilots for determination of a reception channel of the repeater node. The set of instructions, when executed by one or more processors of the transmitter node, may cause the transmitter node to transmit, to the repeater node, the first signal.

Some aspects described herein relate to a non-transitory computer-readable medium that stores a set of instructions for wireless communication by a control node. The set of instructions, when executed by one or more processors of the control node, may cause the control node to determine, for a repeater node, a configuration for reception of a first signal that includes repeater node pilots and a second signal, the second signal for forwarding by the repeater node to a received node. The set of instructions, when executed by one or more processors of the control node, may cause the control node to transmit, to the repeater node, an indication of the configuration.

Some aspects described herein relate to a non-transitory computer-readable medium that stores a set of instructions for wireless communication by a repeater node. The set of instructions, when executed by one or more processors of the repeater node, may cause the repeater node to receive, from a transmitter node or a control node, a first signal that includes a second signal and repeater node pilots, the second signal for forwarding to a receiver node. The set of instructions, when executed by one or more processors of the repeater node, may cause the repeater node to measure the repeater node pilots to obtain one or more of a measurement value or a channel estimation of a reception channel of the repeater node. The set of instructions, when executed by one or more processors of the repeater node, may cause the repeater node to transmit the second signal to the receiver node.

Some aspects described herein relate to an apparatus for wireless communication. The apparatus may include means for determining repeater node pilots associated with a repeater node. The apparatus may include means for generating a first signal based at least in part on the repeater node pilots and a second signal, the second signal for forwarding by the repeater node to a receiver node and the repeater node pilots for determination of a reception channel of the repeater node. The apparatus may include means for transmitting, to the repeater node, the first signal.

Some aspects described herein relate to an apparatus for wireless communication. The apparatus may include means for determining, for a repeater node, a configuration for reception of a first signal that includes repeater node pilots and a second signal, the second signal for forwarding by the repeater node to a received node. The apparatus may include means for transmitting, to the repeater node, an indication of the configuration.

Some aspects described herein relate to an apparatus for wireless communication. The apparatus may include means for receiving, from a transmitter node or a control node, a first signal that includes a second signal and repeater node pilots, the second signal for forwarding to a receiver node. The apparatus may include means for measuring the repeater node pilots to obtain one or more of a measurement value or a channel estimation of a reception channel of the apparatus. The apparatus may include means for transmitting the second signal to the receiver node.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
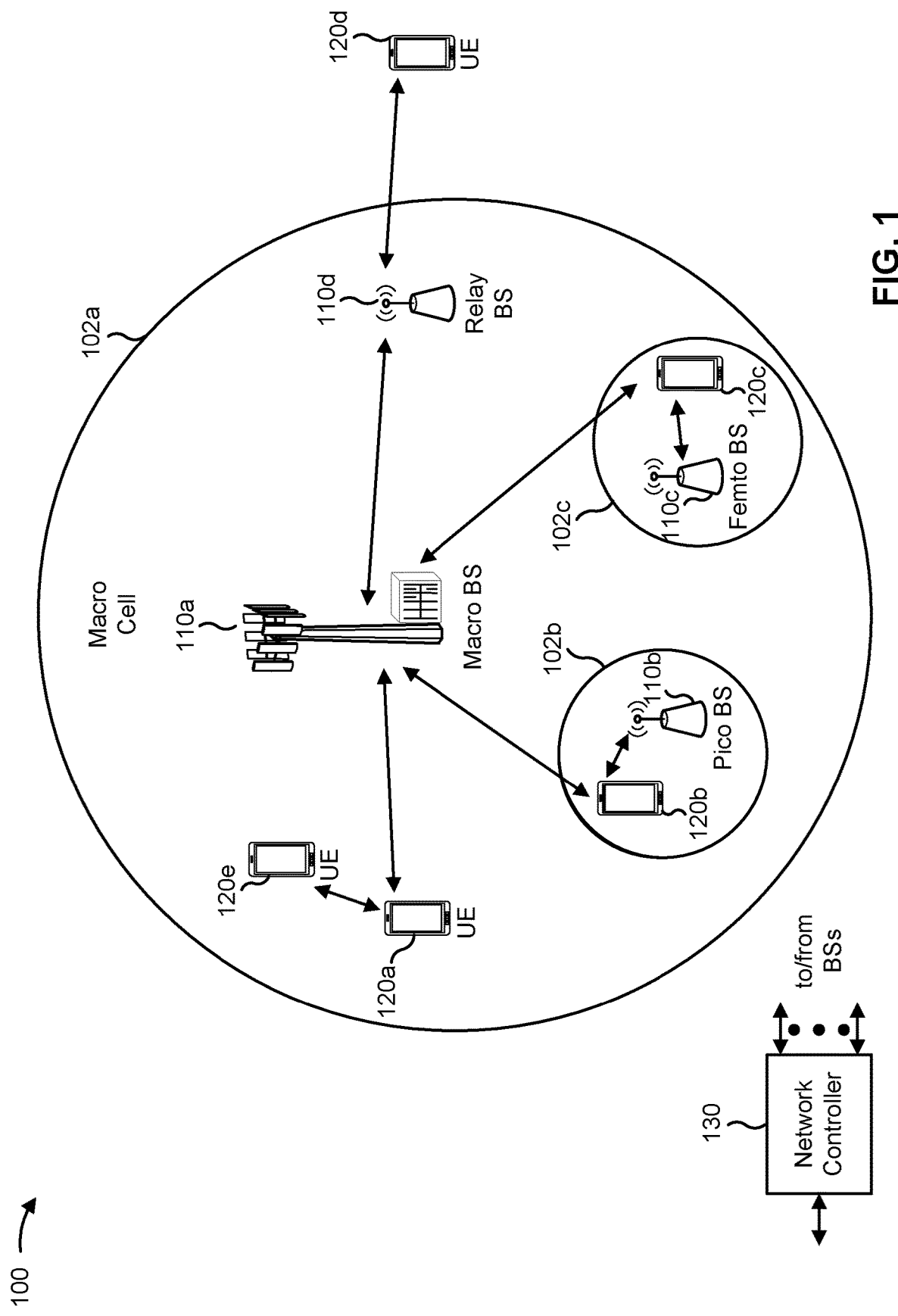
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
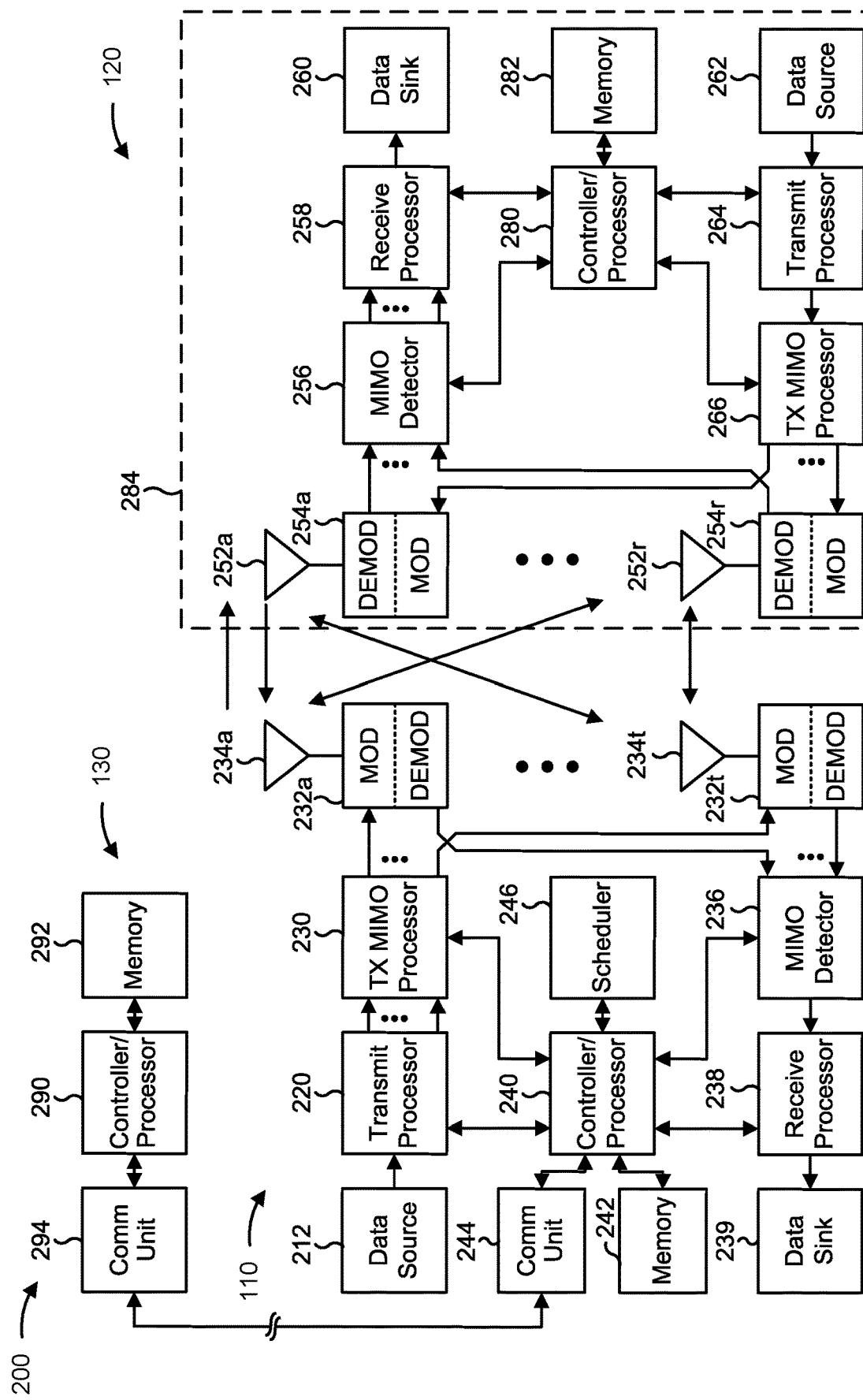
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with adding pilots to a forwarded signal by a repeater node, as described in more detail elsewhere herein, and/or one or more techniques associated with adding repeater node pilots to a signal to be forwarded by a repeater node, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1500 of FIG. 15, process 1600 of FIG. 16, process 1700 of FIG. 17, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1500 of FIG. 15, process 1600 of FIG. 16, process 1700 of FIG. 17, and/or other processes as described herein. In some aspects, executing instructions may include running the instructions, converting the instructions, compiling the instructions, and/or interpreting the instructions.

In some aspects, a repeater node (e.g., a base station 110) may include means for receiving a first signal to be forwarded to a receiver node or a control node; means for generating a second signal that includes repeater node pilots and the first signal to be forwarded to the receiver node or the control node; means for transmitting, to the receiver node or the control node, the second signal; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a control node (e.g., a base station 110) may include means for transmitting, to a repeater node, an indication of a configuration for generation of a second signal that includes repeater node pilots and a first signal to be forwarded to a receiver node or the control node; means for determining a channel estimate of a transmission channel of the repeater node based at least in part on the repeater node pilots; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a receiver node (e.g., a base station 110) may include means for receiving, from a repeater node, a second signal that includes a first signal with repeater node pilots; means for determining a channel estimate of a transmission channel of the repeater node based at least in part on the repeater node pilots; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a transmitter node (e.g., a base station 110) may include means for determining, by the transmitter node, repeater node pilots associated with a repeater node; means for generating a first signal based at least in part on the repeater node pilots and a second signal, the second signal for forwarding by the repeater node to a receiver node and the repeater node pilots for determination of a reception channel of the repeater node; means for transmitting, to the repeater node, the first signal; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a control node (e.g., a base station 110) may include means for transmitting, to a repeater node, an indication of a configuration of a first signal that includes repeater node pilots and a second signal, the second signal for forwarding by the repeater node to a receiver node; means for determining a channel estimate of a reception channel of the repeater node based at least in part on the repeater node pilots; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a repeater node (e.g., a base station 110) may include means for receiving, from a transmitter node or a control node, a first signal that includes a second signal and repeater node pilots, the second signal for forwarding to a receiver node; means for transmitting, to the control node, feedback associated with the repeater node pilots; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
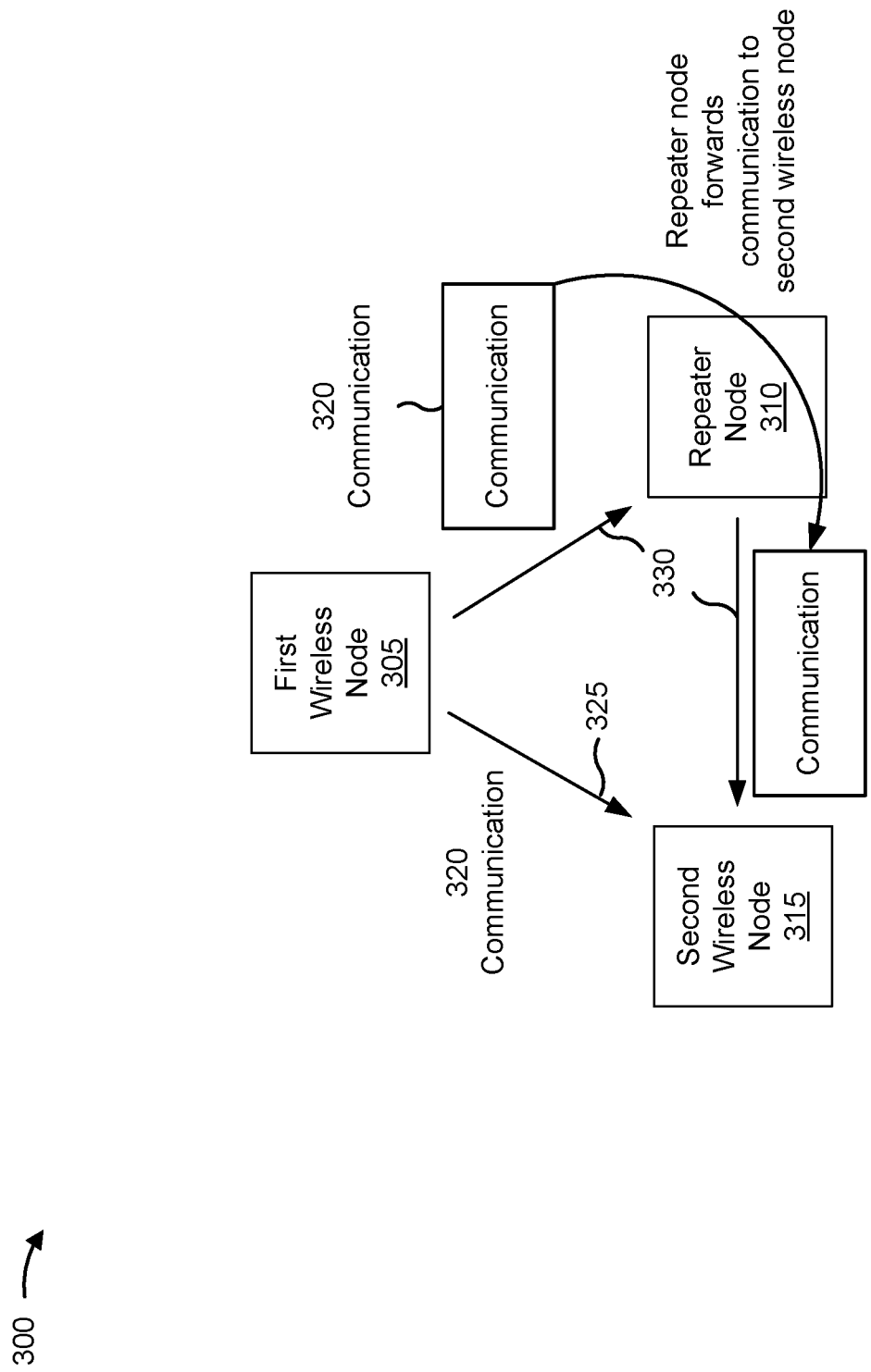
FIG. 3 is a diagram illustrating an example of a repeater node that forwards communications between a first wireless node and a second wireless node, in accordance with the present disclosure.

FIG. 3 is a diagram illustrating an example 300 of a repeater node (also referred to herein as a "repeater") that forwards communications between a first wireless node and a second wireless node, in accordance with the present disclosure. As shown, example 300 includes a first wireless node 305 (e.g., an integrated access and backhaul (IAB) node, an IAB donor, a base station 110, and UE 120, and/or the like), a repeater node 310 (e.g., a repeater device, a base station 110, a UE 120, a millimeter wave repeater, a digital repeater, an analog repeater, and/or the like), and a second wireless node (e.g., an IAB node, an IAB donor, a base station 110, and UE 120, another repeater node 310, and/or the like). In example 300, the first wireless node 305 and/or a second wireless node may be aware of the repeater node 310. In some aspects, the first wireless node 305 and/or a second wireless node may be unaware of the repeater node 310.

As shown in FIG. 3, the first wireless node 305 may want to transmit a communication 320 (e.g., a data communication, a control communication, and/or the like) to the second wireless node 315 using a direct link 325 (e.g., an access link and/or the like) between the first wireless node 305 and the second wireless node 315. However, the first wireless node 305 may be unable to transmit the communication 320 to the second wireless node 315 using the direct link 325. For example, the second wireless node 315 may be outside of a transmit range of the first wireless node 305, the direct link 325 may be blocked, and/or the like.

Therefore, the first wireless node 305 may communicate with the second wireless node 315 using an indirect link 330. For example, the first wireless node 305 may transmit the communication 320 to the repeater node 310. In some aspects, the first wireless node 305 may transmit the communication 320 directly to the repeater node 310 (e.g., when the first wireless node 305 is aware of the repeater node 310). In some aspects, the repeater node 310 may be configured (e.g., by a control node, by the second wireless node 315, and/or the like) to receive the communication 320 from the first wireless node 305 (e.g., when the first wireless node 305 is unaware of the repeater node 310).

As shown in FIG. 3, the communication 320 may pass through the repeater node 310 and be forwarded by the repeater node 310. For example, the repeater node 310 may receive the communication 320 and may re-generate a signal of the communication 320 based at least in part on the communication 320. In some cases, an indirect link 330 may be an access link, a side link, or a fronthaul link. For example, if the first wireless node 305 is a base station 110 and the second wireless node 315 is a UE 120, the indirect link 330 between the first wireless node 305 and the repeater node 310 may be a fronthaul link. The indirect link 330 between the repeater node 310 and the second wireless node 315 may be an access link. Using the communication scheme shown in FIG. 3 may improve network performance and increase reliability by providing the first wireless node 305 and/or the second wireless node 315 with link diversity for communications, by extending a communication coverage area of the first wireless node 305 and/or the second wireless node 315, and/or the like.

As indicated above, FIG. 3 is provided as an example. Other examples may differ from what is described with respect to FIG. 3.

Figure 4:
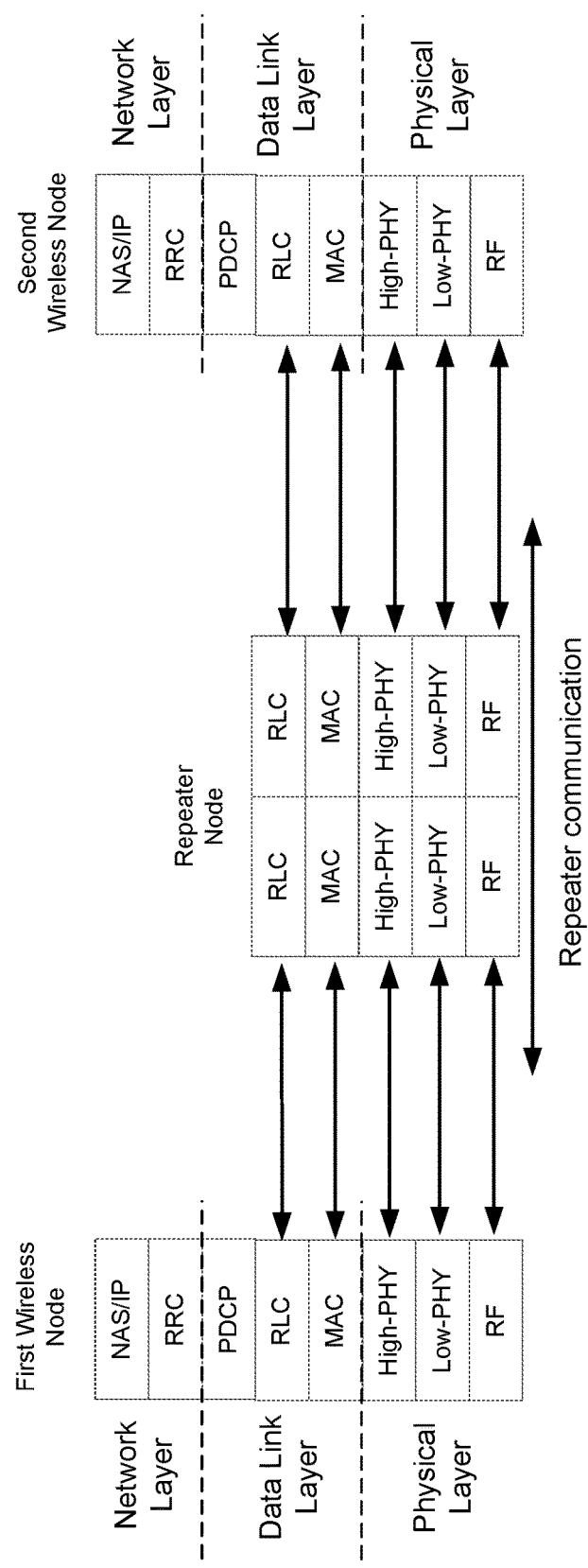
FIG. 4 is a diagram illustrating an example of a protocol stack for repeating communications between a first wireless node and second wireless node, in accordance with the present disclosure.

FIG. 4 is a diagram illustrating an example 400 of a protocol stack for repeating communications between a first wireless node and second wireless node, in accordance with the present disclosure. In some aspects, the first wireless node may be the first wireless node 305 and the second wireless node may be the second wireless node 315. In some aspects, the first wireless node and the second wireless node may communicate with a repeater node (e.g., repeater node 310 and/or the like).

As shown in FIG. 4, an NR protocol stack implemented on a first wireless node and on a second wireless node includes a network layer (e.g., Layer 3), a data link layer (e.g., Layer 2) and a physical layer (e.g., Layer 1). The network layer may include a non-access stratum (NAS) layer, an internet protocol (IP) layer, a radio resource control (RRC) layer, and/or the like. The data link layer may include a packet data convergence protocol (PDCP) layer, a radio link control (RLC), a medium access control (MAC), and/or the like. The physical layer may include a high-physical (PHY) layer, a low-PHY layer, a radio frequency (RF) layer, and/or the like. In some aspects, the PDCP layer on a wireless node may include an adaptation sub-layer (e.g., a service data adaptation protocol (SDAP) sub-layer) and/or the like.

In some aspects, such as in an IAB network, the NAS layer, the IP layer, the RRC layer, the PDCP layer, and/or the like may be included in a central unit (CU) of an IAB donor. The remaining layers (e.g., the RLC layer, the MAC layer, the high-PHY layer, the low-PHY layer, the RF layer, and/or the like) may be included in a distributed unit (DU) of an IAB donor and/or of an IAB node.

When communicating directly with the second wireless node, the first wireless node may communicate at an RLC layer, a MAC layer, a high-PHY layer, a low-PHY layer, an RF layer, and/or the like. As shown in FIG. 4, the layers in the first wireless node may communicate with corresponding layers in the second wireless node. However, in a repeating scenario, the first wireless node may communicate via a link (e.g., an access link, a fronthaul link, and/or the like) with a repeater node. For example, to enable Layer 2 repeating (e.g., data link layer repeating) between the first wireless node and the second wireless node, the repeater node may include an RLC layer, a MAC layer, a high-PHY layer, a low-PHY layer, and an RF layer to communicate with a corresponding RLC layer, MAC layer, high-PHY layer, low-PHY layer, and RF layer of the first wireless node and second wireless node. Based at least in part on passing information between these layers, the repeater node enables Layer 2 repeating between the first wireless node and the second wireless node.

In some aspects, the repeater node may utilize Layer 1 repeating (e.g., physical layer repeating). For example, the repeater node may not include an RLC layer or a MAC layer. As the repeater node may not include an RLC or MAC layer, the repeater node may be configured and/or scheduled by a control node (e.g., a CU, an IAB donor, and IAB node, a base station 110, the first wireless node, the second wireless node, and/or the like). The repeater node may communicate with the first wireless node and the second wireless node at the physical layer only (e.g., rather than the data link layer and the physical layer). Based at least in part on passing information between these layers, the repeater node enables Layer 1 repeating between the first wireless node and the second wireless node.

As indicated above, FIG. 4 is provided as an example. Other examples may differ from what is described with respect to FIG. 4.

Figure 5:
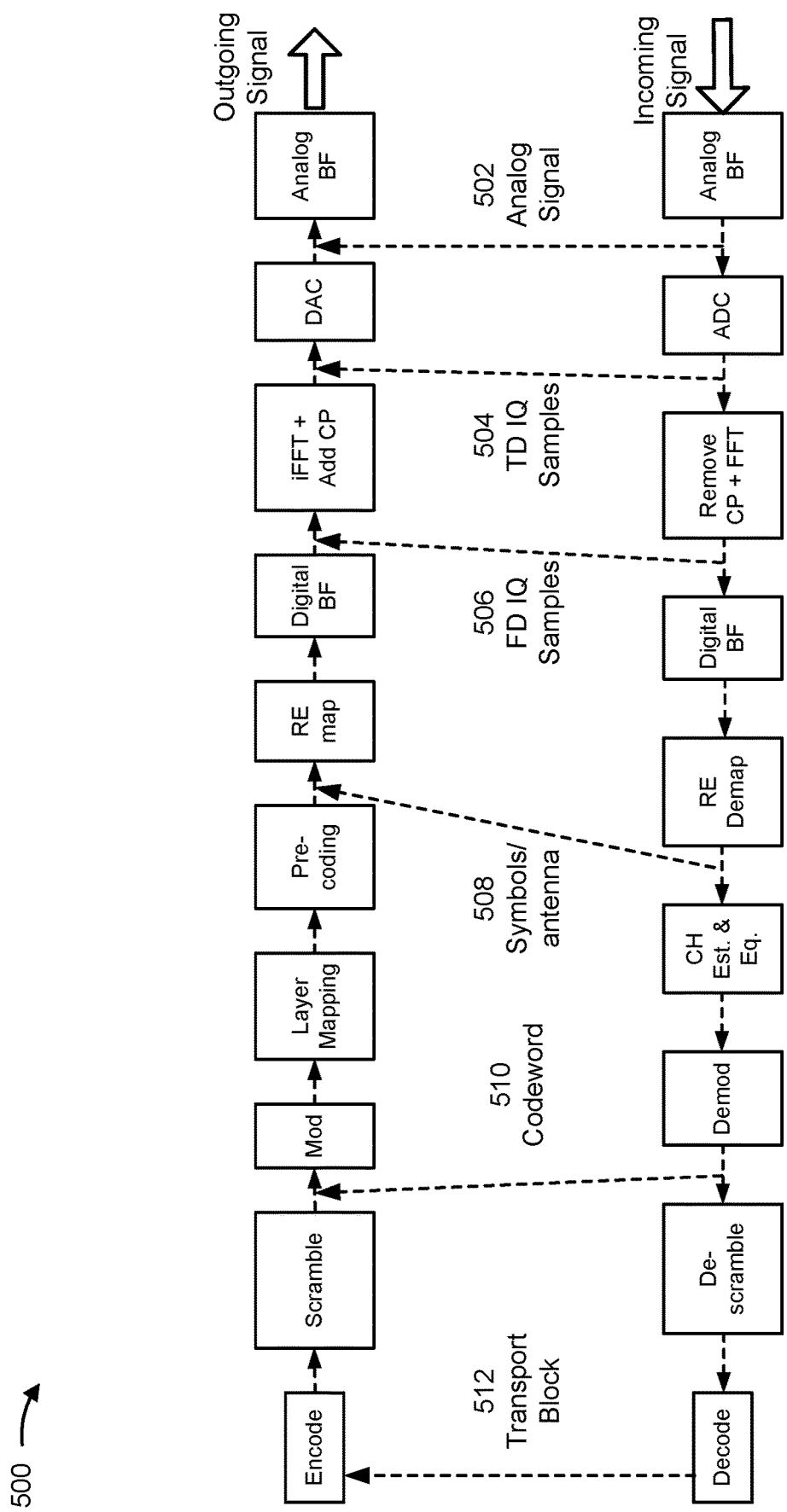
FIG. 5 is a diagram illustrating an example of techniques for processing operations for a repeating operation performed by a repeater node, in accordance with the present disclosure.

FIG. 5 is a diagram illustrating an example 500 of processing operations for a repeating operation performed by a repeater node, in accordance with the present disclosure. A repeating operation may include a repeater node receiving a signal from a first wireless node, processing the signal, re-generating the same signal based at least in part on the processing of the signal, or transmitting the re-generated signal to a second wireless node. In this way, the repeater node may repeat the signal received from the first wireless node to the second wireless node.

As shown by reference number 502, the repeater node may receive an incoming signal from a first wireless node and may perform an analog beamforming procedure to obtain an analog signal associated with the incoming signal. The repeater node may extract the analog signal and may re-generate the analog signal in a transmit (Tx) chain of the repeater node. For example, the repeater node may perform an analog beamforming procedure on the analog signal to form the outgoing signal (e.g., the repeater may boost the analog signal, apply an analog beamforming gain, and/or the like). The repeater node may transmit the outgoing signal to a second wireless node. A repeater node that operates in this manner may be referred to as an analog repeater device (e.g., as the incoming signal is not converted from the analog domain to the digital domain).

As shown by reference number 504, after receiving the incoming signal and performing an analog beamforming procedure associated with the incoming signal, the repeater node may convert the incoming signal from the analog domain to the digital domain using an analog-to-digital converter (ADC). After converting the incoming signal from the analog domain to the digital domain, the repeater node may determine one or more time domain in-phase/quadrature (IQ) samples associated with the incoming signal. The repeater node may extract the time domain IQ samples and may store the time domain IQ samples in a buffer of the repeater node. The repeater node may use the time domain IQ samples to regenerate the incoming signal in the Tx chain of the repeater node (e.g., immediately after extracting the time domain IQ samples or at a later time). For example, the repeater node may convert the time domain IQ samples from the digital domain to the analog domain using a digital-to-analog converter (DAC). The repeater node may perform an analog beamforming procedure on the analog signal to form the outgoing signal. The repeater node may transmit the outgoing signal to a second wireless node.

As shown by reference number 506, after converting the incoming signal from the analog domain to the digital domain, the repeater node may remove a cyclic prefix (CP) associated with the incoming signal and perform a fast-Fourier transform (FFT) on the incoming signal. After removing the CP and performing the FFT associated with the incoming signal, the repeater node may determine one or more frequency domain IQ samples associated with the incoming signal. The repeater node may extract the frequency domain IQ samples and may store the frequency domain IQ samples in a buffer of the repeater node. The repeater node may use the frequency domain IQ samples to regenerate the incoming signal in the Tx chain of the repeater node (e.g., immediately after extracting the frequency domain IQ samples or at a later time). For example, the repeater node may perform an inverse FFT (iFFT) operation on the frequency domain IQ samples, in order to generate time domain IQ samples. The repeater node may add a CP to the time domain IQ samples. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

As shown by reference number 508, after removing the CP and performing FFT associated with the incoming signal, the repeater node may perform a digital beamforming procedure associated with the incoming signal. The repeater node may perform a resource element (RE) de-mapping operation associated with the incoming signal. After performing the digital beamforming procedure and the RE de-mapping procedure, the repeater node may determine one or more IQ samples of occupied tones (e.g., a quantity of symbols per antenna element) associated with the incoming signal. The repeater node may extract the IQ samples of occupied tones and may store the IQ samples of occupied tones in a buffer of the repeater node. The repeater node may use the IQ samples of occupied tones to regenerate the incoming signal in the Tx chain of the repeater node (e.g., immediately after extracting the IQ samples of occupied tones or at a later time). For example, the repeater node may perform an RE mapping procedure (e.g., the inverse of the RE de-mapping procedure) associated with the IQ samples of occupied tones. The repeater node may perform a digital beamforming procedure associated with the IQ samples of occupied tones. After performing the digital beamforming procedure, the repeater node may perform an iFFT procedure and add a CP to the signal. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

As shown by reference number 510, after performing the digital beamforming procedure and the RE de-mapping operation, the repeater node may perform channel estimation and equalization associated with the incoming signal (e.g., to determine and/or remove noise and wireless channel variations associated with the incoming signal). The repeater node may perform a demodulation operation associated with the incoming signal. After performing channel estimation and equalization and the demodulation operation, the repeater node may determine a codeword associated with the incoming signal. The repeater node may extract the codeword and may store the codeword in a buffer of the repeater node. The repeater node may use the codeword to regenerate the incoming signal in the Tx chain of the repeater node (e.g., immediately after extracting the codeword or at a later time). For example, the repeater node may perform a modulation operation, a layer mapping operation, a pre-coding operation, an RE-mapping operation, and/or a digital beamforming procedure associated with the codeword. The repeater node may perform an iFFT procedure and add a CP to the signal. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

As shown by reference number 512, after performing the channel estimate and equalization and demodulation operation associated with the incoming signal, the repeater node may perform a de-scrambling operation (e.g., using scrambling identifiers associated with the incoming signal). The repeater node may decode the incoming signal in accordance with a network coding scheme associated with the incoming signal. After decoding the incoming signal, the repeater node may determine a transport block associated with the incoming signal. The repeater node may extract the transport block and may store the transport block in a buffer of the repeater node. The repeater node may use the transport block to regenerate the incoming signal in the Tx chain of the repeater node (e.g., immediately after extracting the transport block or at a later time). For example, the repeater node may encode the transport block (e.g., in accordance with the network coding scheme) and scramble the encoded transport block. The repeater node may perform a modulation operation, a layer mapping operation, a pre-coding operation, an RE-mapping operation, and/or a digital beamforming procedure associated with the scrambled transport block. The repeater node may perform an iFFT procedure and add a CP to the signal. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

The different operations described above may be configured by a control node associated with the repeater node. For example, a level of processing (e.g., as shown by reference numbers 502, 504, 506, 508, 510, and 512) may be indicated to the repeater node by the control node. A repeater node that performs processing of an incoming signal after converting the signal to the digital domain may be referred to as a digital repeater device. For example, a repeater node that performs the operations described above with respect to reference numbers 504, 506, 508, 510, or 512 may be referred to as a digital repeater device.

The number and arrangement of components shown in FIG. 5 is provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally or alternatively, a set of components (e.g., one or more components) shown in FIG. 5 may perform one or more functions described as being performed by another set of components shown in FIG. 5.

In some wireless networks, a repeater node may forward uplink, downlink, or side-link communications between wireless nodes. For example, the repeater node may forward communications between a control node and a first wireless node (e.g., a UE), between a first wireless node and a second wireless node, and/or the like. The communications may include pilots, such as demodulation reference signals, phase tracking reference signals, and/or the like that are inserted by a transmitter node. A receiver node may attempt to estimate an effective channel between the transmitter node and the receiver node, which includes multiple hops involving the repeater node. However, the effective channel may be difficult to estimate based at least in part on the multiple hops having different effects on the communications. In some aspects, attempting to estimate the effective channel in a single step may consume computing and communication resources of the receiver node. Additionally, or alternatively, the transmitter node may transmit the communications having a relatively high density of pilots to facilitate the attempt to estimate the effective channel, which may consume network resources. Further, a control node may be unaware of a channel estimate of a transmission channel of the repeater node, which may result in an inefficient configuration of transmission parameters of the repeater node.

In some aspects described herein, a repeater node may receive a first signal from a transmitter device. The repeater node may insert repeater node pilots into the signal before forwarding the signal. In some aspects, the repeater node may generate a second signal that includes repeater node pilots and the first signal to be forwarded to the receiver node or the control node. In some aspects, the repeater node may generate the second signal based at least in part on a configuration received from the control node. In some aspects, generation of the second signal may include frequency-domain multiplexing of the repeater node pilots with the first signal, time-domain multiplexing of the repeater node pilots with the first signal, decoding of the first signal and reencoding of the first signal with the repeater node pilots, and/or the like.

In some aspects, a receiver node may receive the second signal and measure the pilots. For example, the receiver node may estimate a transmission channel of the repeater node. In some aspects, the receiver node may perform channel equalization on the first signal (e.g., including resources carrying additional pilots within the signal) based at least in part on the pilots. The receiver node may perform a channel estimation of a channel, or an effective channel, between a transmitter device and the repeater node based at least in part on pilots within the first signal. In this way, the receiver node may perform channel equalization in two steps based at least in part on different sets of pilots, which may conserve computing resources when compared to attempting to perform channel equalization in a single step, and which may facilitate a reduction in pilots used in the first signal. Additionally, or alternatively, the receiver node may provide feedback to the control node to enable the control node to configure the repeater node for subsequent communications based at least in part on the repeater pilots.

Figure 6:
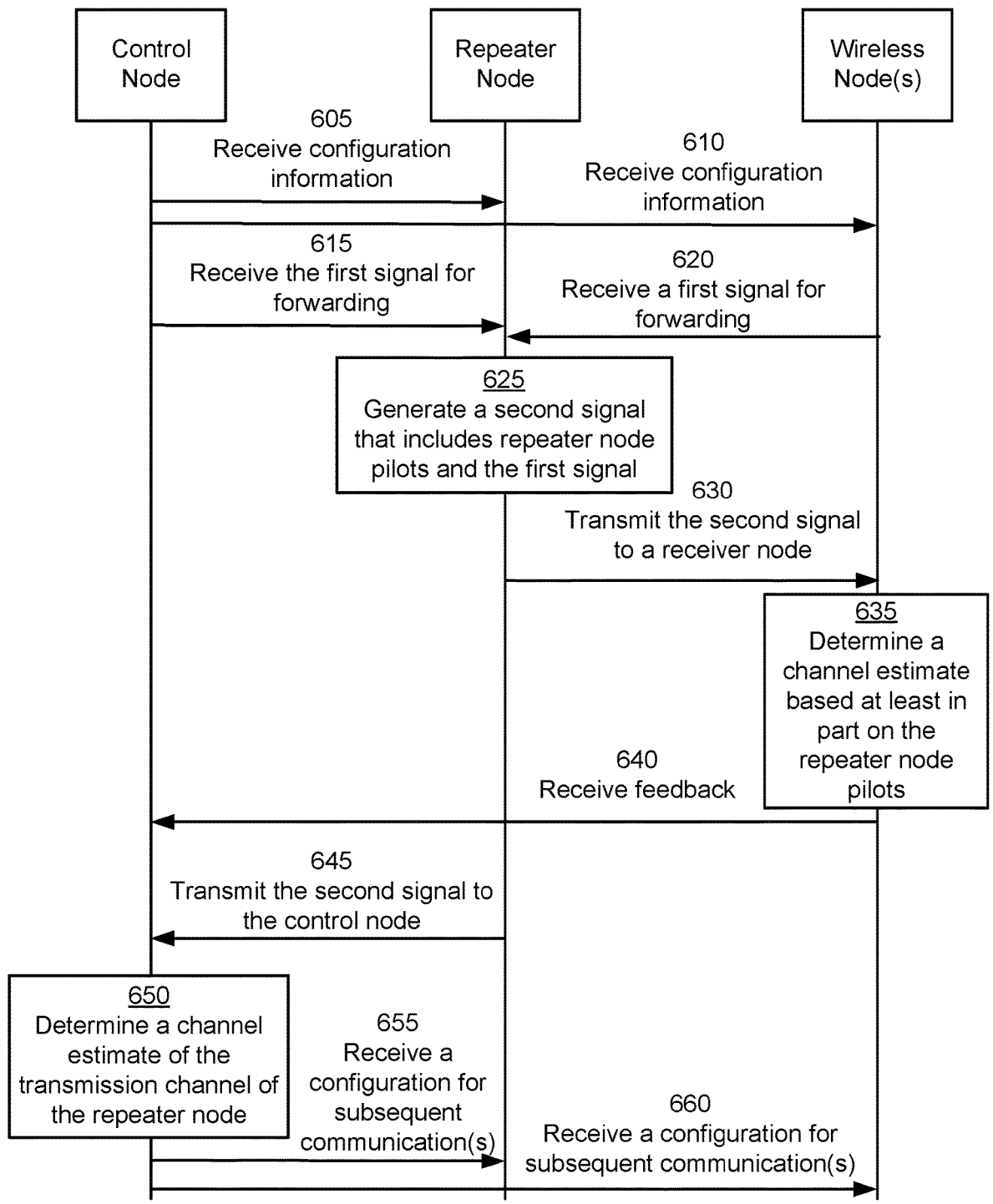
FIGS. 6 and 7 are diagrams illustrating one or more examples associated with techniques for adding pilots to a forwarded signal by a repeater node, in accordance with the present disclosure.

FIG. 6 is a diagram illustrating an example 600 associated with techniques for adding pilots to a forwarded signal by a repeater node, in accordance with the present disclosure. As shown in FIG. 6, a control node (e.g., a base station 110) may communicate with a repeater node (e.g., a base station 110) and/or one or more wireless nodes. The one or more wireless nodes may include a transmitter node, a receiver node, and/or the like. The control node, the repeater node, and the one or more wireless nodes may be part of a wireless network (e.g., wireless network 100). In some aspects, the control node and the receiver node may be a same device or may be co-located devices.

As shown by reference number 605, the repeater node may receive configuration information from the control node. In some aspects, the repeater node may receive an indication of a configuration for generation of a signal that includes repeater node pilots and a received signal to be forwarded to the receiver node or the control node.

As shown by reference number 610, the one or more wireless nodes may receive configuration information from the control node. In some aspects, a receiver node may receive an indication of a configuration that the repeater node will use to forward signals that include repeater node pilots and other signals that are received by the repeater node from a transmitter node.

As shown by reference number 615, the repeater node may receive a first signal for forwarding from the control node. As shown by reference number 620, the repeater node may receive a first signal for forwarding from the one or more wireless nodes (e.g., a transmitter node). In some aspects, the repeater node may receive the first signal from a UE (e.g., of the one or more wireless nodes), a base station (e.g., an IAB node of the one or more wireless nodes), and/or the like as an uplink communication. In some aspects, the repeater node may receive the first signal from the control node, a base station (e.g., an IAB node of the one or more wireless nodes), and/or the like as a downlink communication.

As shown by reference number 625, the repeater node may generate a second signal that includes repeater node pilots and the first signal. In some aspects, the repeater node may generate the second signal based at least in part on frequency-domain multiplexing the repeater node pilots with the first signal, time-domain multiplexing the repeater node pilots with the first signal, decoding of the first signal and reencoding of the first signal with the repeater node pilots, and/or the like. In some aspects, the repeater node may transmit the repeater node pilots on frequency tones that are adjacent to tones used to carry the first signal. In some aspects, the repeater node may transmit the repeater node pilots within one or more symbols that are adjacent to the symbols used to carry the first signal. In some aspects, the repeater node may decode the first signal, and reencode the first signal with the repeater node pilots interleaved within resources that carry first signal.

As shown by reference number 630, the repeater node may transmit the second signal to a receiver node. For example, if the first signal is not intended for the control node (e.g., the control node is not a party to the communications), the repeater node may transmit the signal to a receiver node of the one or more wireless nodes.

As shown by reference number 635, at least one of the one or more wireless nodes may determine a channel estimate based at least in part on the repeater node pilots. For example, a receiver node may determine a channel estimate of the transmission channel of the repeater node based at least in part on the repeater node pilots. In some aspects, the receiver node may determine a channel estimate of a channel, or effective channel, between the repeater node and a transmitter node. The receiver node may use the channel estimate of the transmission channel of the repeater node and the channel estimate of the channel, or effective channel, between the repeater node and the transmitter node to perform channel equalization on the first signal.

As shown by reference number 640, the control node may receive feedback from the at least one of the one or more wireless nodes. For example, the feedback may be based at least in part on the repeater pilots, may indicate a channel estimation of the transmission channel of the repeater node, and/or the like.

As shown by reference number 645, the repeater node may transmit the second signal to the control node. In some aspects, the repeater node may transmit the second signal to the control node based at least in part on the first signal being intended for the control node, the control node being co-located with the receiver node, and/or the like.

As shown by reference number 650, the control node may determine a channel estimate of the transmission channel of the repeater node. In some aspects, the control node may determine the channel estimate of the transmission channel of the repeater node based at least in part on the repeater node pilots. In some aspects, the control node may determine the channel estimate based at least in part on reception of the second signal from the repeater node, reception of the feedback from the receiver node, and/or the like.

As shown by reference number 655, the repeater node may receive a configuration for one or more subsequent communications. In some aspects, the control node may transmit the configuration for one or more subsequent communications based at least in part on the channel estimation of the transmission channel of the repeater node. In some aspects, the configuration may indicate scheduling for a subsequent communication, a transmission configuration for the subsequent communication, beam management of one or more of a receive beam or a transmit beam of the repeater node, an association of the repeater node with one or more wireless communication devices (e.g., transmitter nodes), and/or the like.

As shown by reference number 660, the at least one wireless node (e.g., a receiver node) may receive a configuration for one or more subsequent communications. In some aspects, the control node may transmit the configuration to the at least one wireless node to indicate a configuration of the repeater node (e.g., the configuration described with reference to reference number 655). In some aspects, the configuration may indicate scheduling for a subsequent communication by the repeater node to the at least one wireless node, a transmission configuration for the subsequent communication, beam management of one or more of a receive beam or a transmit beam of the repeater node, an association of the repeater node with one or more wireless communication devices (e.g., to indicate whether the at least one wireless node may access the one or more wireless communication devices via the repeater node), and/or the like.

Based at least in part on the repeater node transmitting the second signal, a receiver node (e.g., a wireless node or a control node) may perform channel equalization in two steps based at least in part on different sets of pilots, which may conserve computing resources when compared to attempting to perform channel equalization in a single step, and which may facilitate a reduction in pilots used in the first signal. Additionally, or alternatively, the receiver node may provide feedback to the control node to enable the control node to configure the repeater node for subsequent communications based at least in part on the repeater pilots.

As indicated above, FIG. 6 is provided as an example. Other examples may differ from what is described with regard to FIG. 6.

Figure 7:
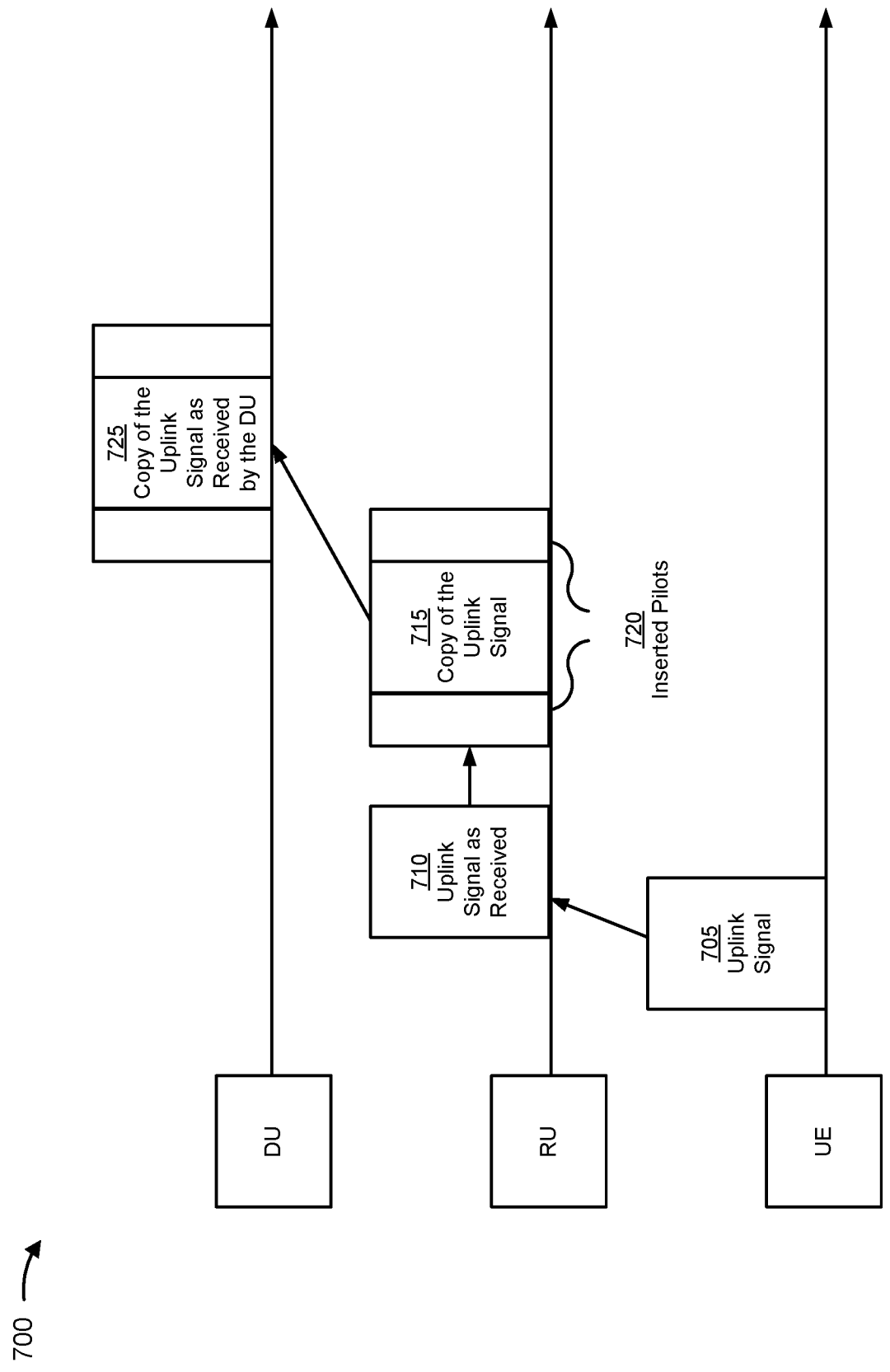

FIG. 7 is a diagram illustrating an example 700 associated with techniques for adding pilots to a forwarded signal by a repeater node, in accordance with the present disclosure. As shown in FIG. 7, a radio unit (RU) may communicate with a distributed unit (DU) (e.g., a repeater node, a base station 110) and/or a UE. The one or more wireless nodes may include a transmitter node, a receiver node, and/or the like. The DU (e.g., a control node, a base station 110, and/or the like), the RU (e.g., a repeater node, a base station 110, and/or the like), and the UE may be part of a wireless network (e.g., wireless network 100). In some aspects, the DU may include a control node and/or a receiver node.

The UE may transmit an uplink signal 705 to the RU. In some aspects, the UE may transmit the uplink signal 705 to the RU for forwarding to the DU. The RU may receive the uplink signal as received by the RU 710. In some aspects, the uplink signal as received by the RU 710 may include channel effects of a reception channel of the RU (e.g., a channel between the RU and the UE).

The RU may generate a copy of the uplink signal 715 that is based at least in part on the uplink signal as received 710. In some aspects, the RU may digitize the copy of the uplink signal 715, store the copy of the uplink signal 715, and then regenerate the copy of the uplink signal 715.

The RU may combine the copy of the uplink signal 715 with inserted pilots 720 (e.g., repeater node pilots). In some aspects, the RU may multiplex the uplink signal 715 with inserted pilots 720 based at least in part on frequency-domain multiplexing, time-domain multiplexing, decoding of the copy of the uplink signal 715 and reencoding of the uplink signal 715 with the inserted pilots, and/or the like. In some aspects, the RU may transmit the inserted pilots on frequency tones that are adjacent to tones used to carry the copy of the uplink signal 715. In some aspects, the RU may transmit the inserted pilots within one or more symbols that are adjacent to the symbols used to carry the copy of the uplink signal 715. In some aspects, the RU may decode the uplink signal 715, and reencode the uplink signal 715 with inserted pilots 720 interleaved within resources that carry the uplink signal 715.

The DU may receive a copy of the uplink signal as received by the DU 725. In some aspects, the DU may determine a channel estimate of a transmission channel of the RU. In some aspects, the DU may determine the channel estimate of the transmission channel of the RU based at least in part on the inserted pilots 720.

As indicated above, FIG. 7 is provided as an example. Other examples may differ from what is described with regard to FIG. 7.

Figure 8:
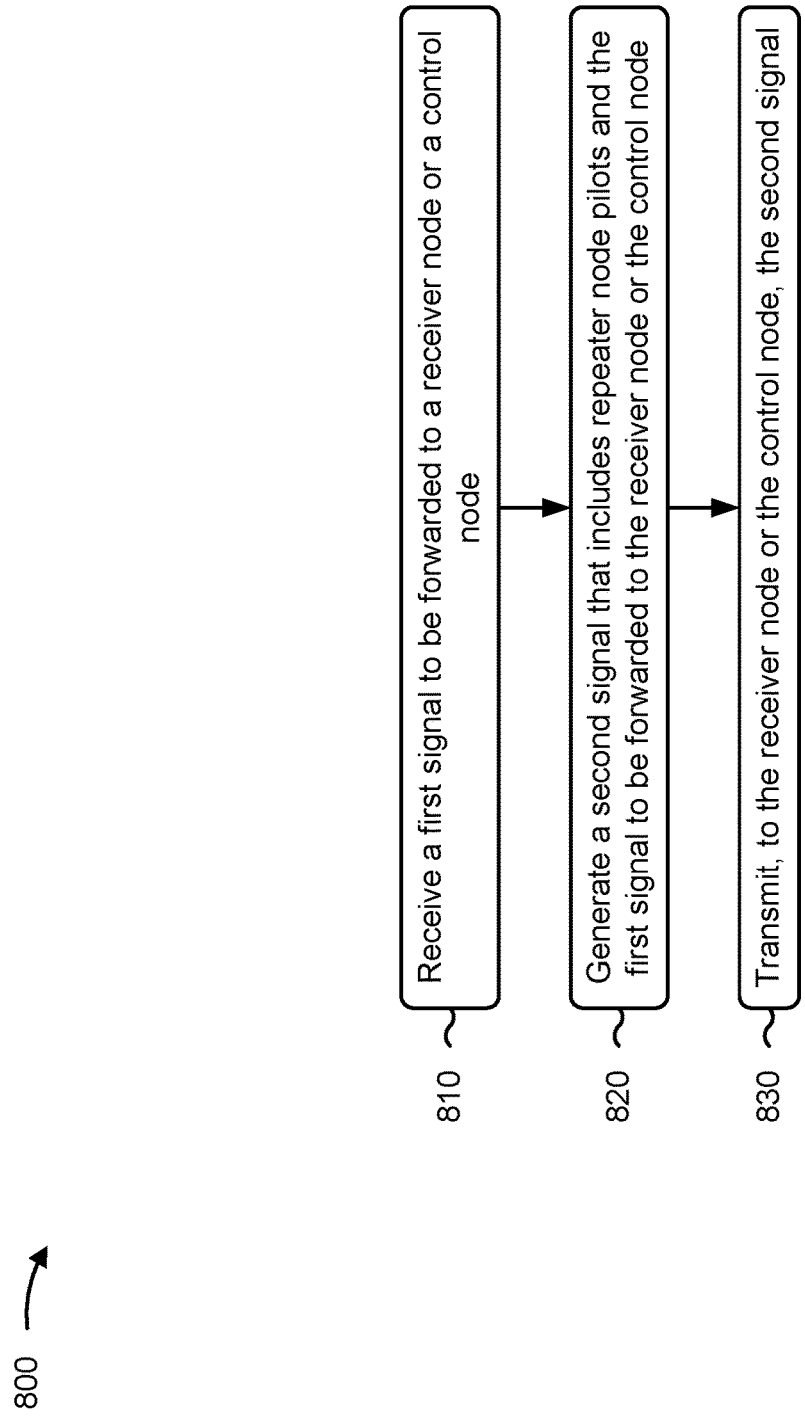
FIGS. 8-10 are diagrams illustrating example processes associated with techniques for adding pilots to a forwarded signal by a repeater node, in accordance with the present disclosure.

FIG. 8 is a diagram illustrating an example process 800 performed, for example, by a repeater node, in accordance with the present disclosure. Example process 800 is an example where the repeater node (e.g., base station 110, apparatus 1100 (described below), and/or the like) performs operations associated with techniques for adding pilots to a forwarded signal by a repeater node.

As shown in FIG. 8, in some aspects, process 800 may include receiving a first signal to be forwarded to a receiver node or a control node (block 810). For example, the repeater node (e.g., using reception component 1102) may receive a first signal to be forwarded to a receiver node or a control node, as described above.

As further shown in FIG. 8, in some aspects, process 800 may include generating a second signal that includes repeater node pilots and the first signal to be forwarded to the receiver node or the control node (block 820). For example, the repeater node (e.g., using generation component 1108) may generate a second signal that includes repeater node pilots and the first signal to be forwarded to the receiver node or the control node, as described above.

As further shown in FIG. 8, in some aspects, process 800 may include transmitting, to the receiver node or the control node, the second signal (block 830). For example, the repeater node (e.g., using transmission component 1104) may transmit, to the receiver node or the control node, the second signal, as described above.

Process 800 may include additional aspects, such as any single aspect or any combination of aspects described below and/or in connection with one or more other processes described elsewhere herein.

In a first aspect, process 800 includes receiving, from the control node, an indication of a configuration for generation of the second signal, wherein generation of the second signal is based at least in part on the configuration.

In a second aspect, alone or in combination with the first aspect, process 800 includes receiving, from the control node and based at least in part on transmitting the second signal, one or more of an indication of scheduling for a subsequent communication, a transmission configuration for the subsequent communication, beam management of one or more of a receive beam or a transmit beam of the repeater node, or an association of the repeater node with one or more wireless communication devices.

In a third aspect, alone or in combination with one or more of the first and second aspects, the first signal comprises an uplink communication or a downlink communication.

In a fourth aspect, alone or in combination with one or more of the first through third aspects, generation of the second signal comprises frequency-domain multiplexing of the repeater node pilots with the first signal, time-domain multiplexing of the repeater node pilots with the first signal, or decoding of the first signal and reencoding of the first signal with the repeater node pilots interleaved within resources that carry the first signal.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
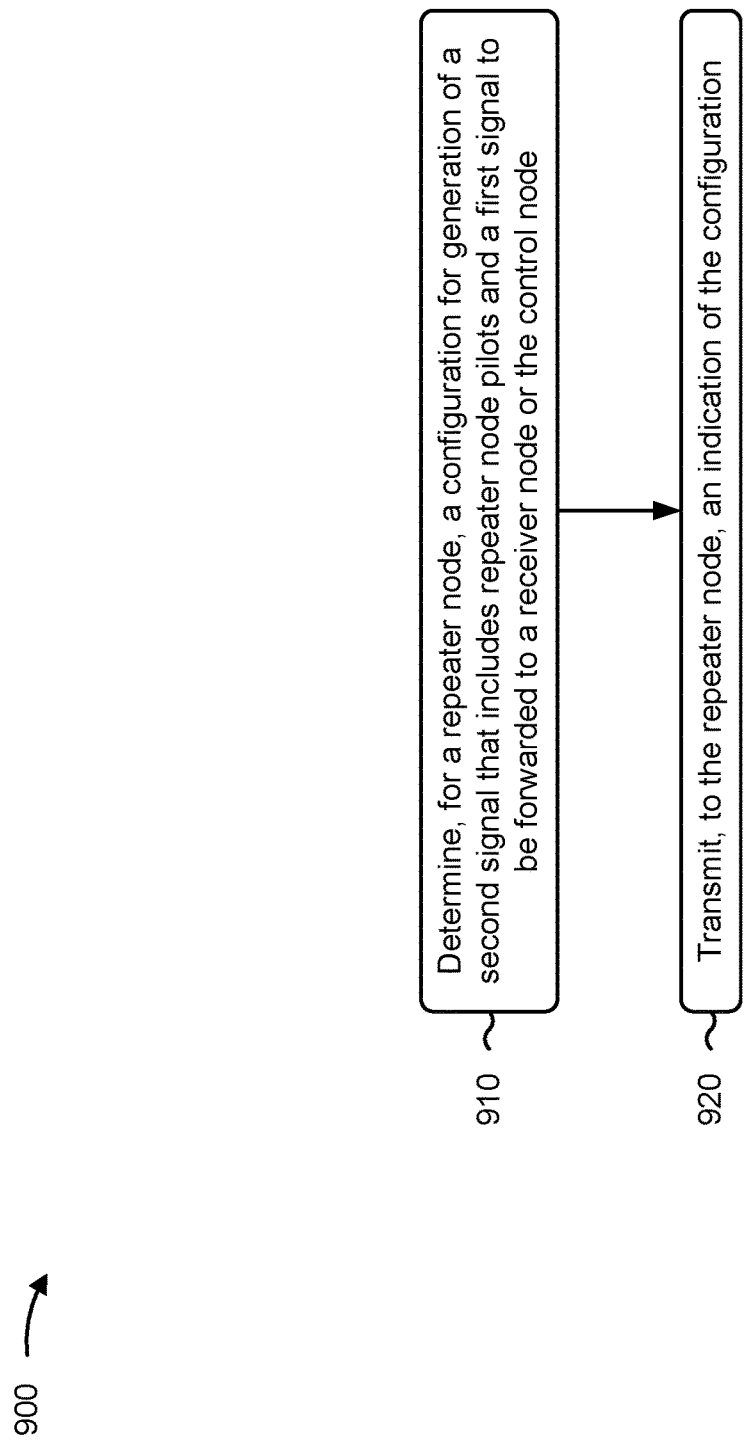

FIG. 9 is a diagram illustrating an example process 900 performed, for example, by a control node, in accordance with the present disclosure. Example process 900 is an example where the control node ((e.g., base station 110, apparatus 1200 (described below), and/or the like) performs operations associated with techniques for adding pilots to a forwarded signal by a repeater node.

As shown in FIG. 9, in some aspects, process 900 may include determining, for a repeater node, a configuration for generation of a second signal that includes repeater node pilots and a first signal to be forwarded to a receiver node or the control node (block 910). For example, the control node (e.g., using determination component 1208) may determine, for a repeater node, a configuration for generation of a second signal that includes repeater node pilots and a first signal to be forwarded to a receiver node or the control node, as described above.

As further shown in FIG. 9, in some aspects, process 900 may include transmitting, to the repeater node, an indication of the configuration (block 920). For example, the control node (e.g., using transmission component 1204) may transmit, to the repeater node, an indication of the configuration, as described above.

Process 900 may include additional aspects, such as any single aspect or any combination of aspects described below and/or in connection with one or more other processes described elsewhere herein.

In a first aspect, process 900 includes determining a channel estimate of a transmission channel of the repeater node based at least in part on the repeater node pilots.

In a second aspect, alone or in combination with the first aspect, process 900 includes receiving the second signal, determination of the channel estimate of the transmission channel of the repeater node is based at least in part on reception of the second signal.

In a third aspect, alone or in combination with one or more of the first and second aspects, process 900 includes receiving, from a receiver node to which the repeater node forwards the second signal, feedback that is based at least in part on the repeater node pilots, determination of the channel estimate of the transmission channel of the repeater node is based at least in part on the feedback that is based at least in part on the repeater node pilots.

In a fourth aspect, alone or in combination with one or more of the first through third aspects, process 900 includes transmitting, to the repeater node and based at least in part on the channel estimate, one or more of an indication of scheduling for a subsequent communication, a transmission configuration for the subsequent communication, beaming management of one or more of a receive beam or a transmit beam of the repeater node, or an association of the repeater node with one or more wireless communication devices.

In a fifth aspect, alone or in combination with one or more of the first through fourth aspects, the first signal includes an uplink communication or a downlink communication.

In a sixth aspect, alone or in combination with one or more of the first through fifth aspects, the configuration for generation of the second signal indicates to perform one or more of frequency-domain multiplexing of the repeater node pilots with the first signal, time-domain multiplexing of the repeater node pilots with the first signal, or decoding of the first signal and reencoding of the first signal with the repeater node pilots.

In a seventh aspect, alone or in combination with one or more of the first through sixth aspects, process 900 includes transmitting, to a receiver node, an additional indication of the configuration.

In an eighth aspect, alone or in combination with one or more of the first through seventh aspects, the control node includes the receiver node, or a transmitter node that transmits the first signal to the control node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
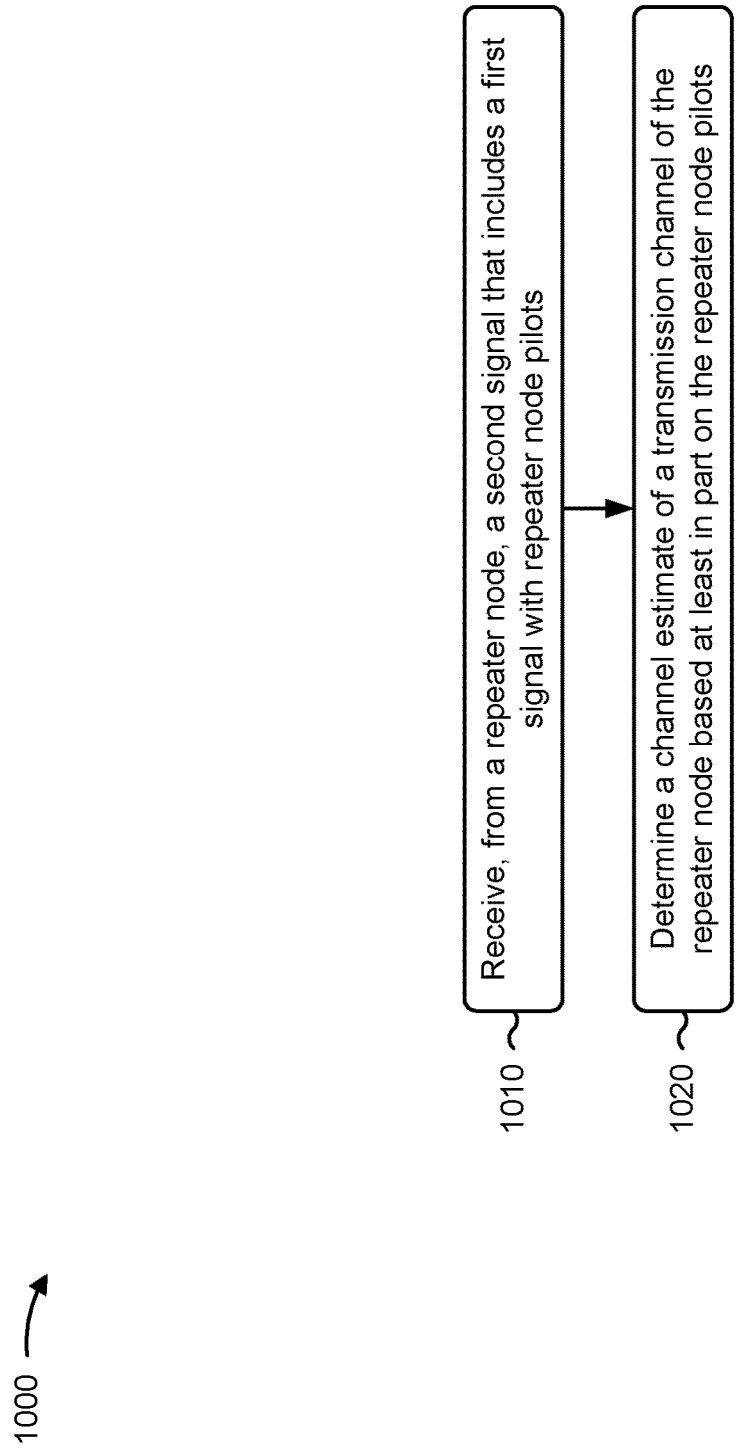

FIG. 10 is a diagram illustrating an example process 1000 performed, for example, by a receiver node, in accordance with the present disclosure. Example process 1000 is an example where the receiver node (e.g., base station 110, apparatus 1300 (described below), and/or the like) performs operations associated with techniques for adding pilots to a forwarded signal by a repeater node.

As shown in FIG. 10, in some aspects, process 1000 may include receiving, from a repeater node, a second signal that includes a first signal with repeater node pilots (block 1010). For example, the receiver node (e.g., using reception component 1302) may receive, from a repeater node, a second signal that includes a first signal with repeater node pilots, as described above.

As further shown in FIG. 10, in some aspects, process 1000 may include determining a channel estimate of a transmission channel of the repeater node based at least in part on the repeater node pilots (block 1020). For example, the receiver node (e.g., using determination component 1308) may determine a channel estimate of a transmission channel of the repeater node based at least in part on the repeater node pilots, as described above.

Process 1000 may include additional aspects, such as any single aspect or any combination of aspects described below and/or in connection with one or more other processes described elsewhere herein.

In a first aspect, process 1000 includes receiving, from a control node, an indication of a configuration of the second signal, and determination of the channel estimate is based at least in part on the configuration.

In a second aspect, alone or in combination with the first aspect, process 1000 includes receiving, from a control node and based at least in part on the channel estimate, one or more of an indication of scheduling for a subsequent communication from the repeater node, or a transmission configuration for the subsequent communication from the repeater node.

In a third aspect, alone or in combination with one or more of the first and second aspects, the first signal comprises an uplink communication or a downlink communication.

In a fourth aspect, alone or in combination with one or more of the first through third aspects, the second signal comprises one or more of frequency-domain multiplexing of the repeater node pilots with the first signal, time-domain multiplexing of the repeater node pilots with the first signal, or node pilots interleaved with the first signal in one or more of a time domain or a frequency domain.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
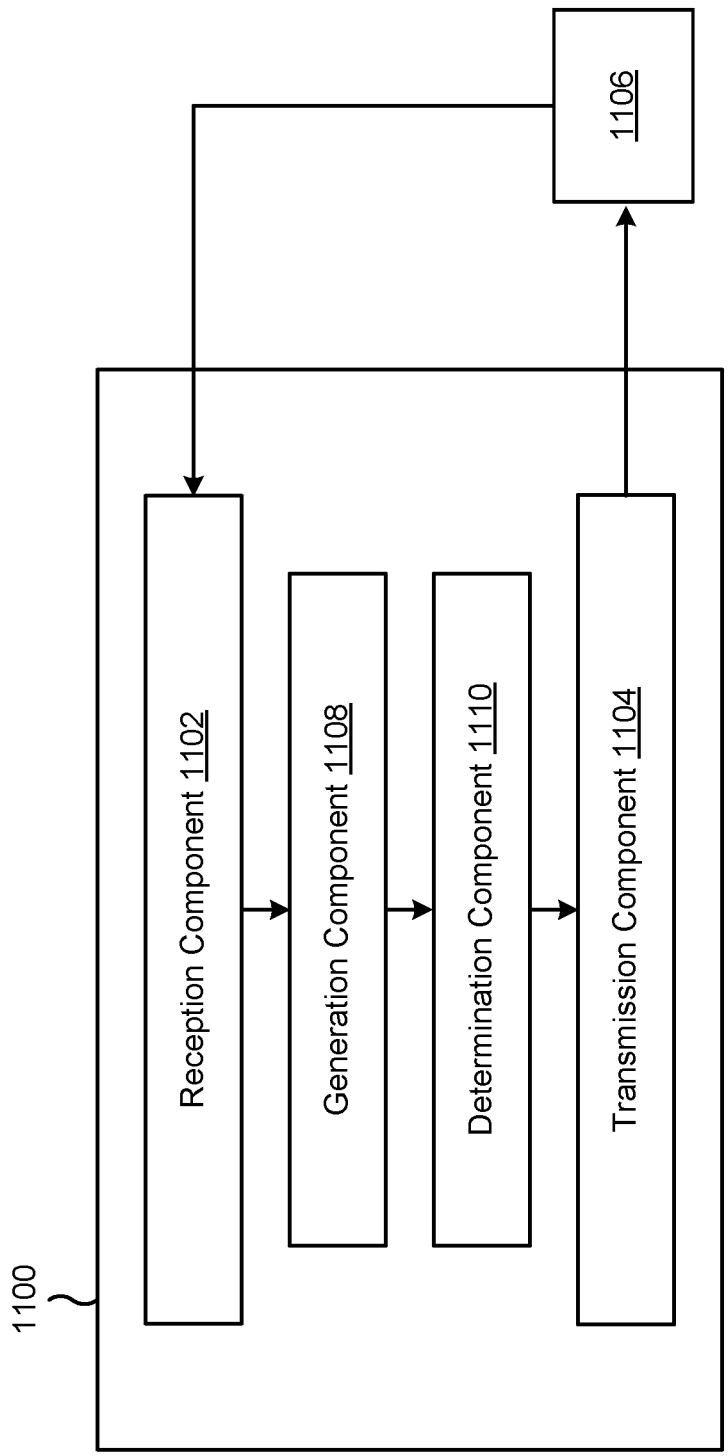
FIGS. 11-13 are block diagrams of example apparatuses for wireless communication, in accordance with the present disclosure.

FIG. 11 is a block diagram of an example apparatus 1100 for wireless communication. The apparatus 1100 may be a repeater node, or a repeater node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a generation component 1108, or a determination component 1110, among other examples.

In some aspects, the apparatus 1100 may be configured to perform one or more operations described herein in connection with FIGS. 3-6. Additionally or alternatively, the apparatus 1100 may be configured to perform one or more processes described herein, such as process 800 of FIG. 8. In some aspects, the apparatus 1100 and/or one or more components shown in FIG. 11 may include one or more components of the repeater node described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the repeater node described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the repeater node described above in connection with FIG. 2. In some aspects, the transmission component 1104 may be co-located with the reception component 1102 in a transceiver.

The reception component 1102 may receive a first signal to be forwarded to a receiver node or a control node. The generation component 1108 may generate a second signal that includes repeater node pilots and the first signal to be forwarded to the receiver node or the control node. In some aspects, the generation component 1108 may include one or more antennas, a demodulator, a MIMO detector, a receive processor, a modulator, a transmit MIMO processor, a transmit processor, a controller/processor, a memory, or a combination thereof, of the repeater node described above in connection with FIG. 2. The transmission component 1104 may transmit, to the receiver node or the control node, the second signal.

The reception component 1102 may receive from the control node, an indication of a configuration for generation of the second signal, wherein generation of the second signal is based at least in part on the configuration. The reception component 1102 may receive from the control node and based at least in part on transmitting the second signal, one or more of: an indication of scheduling for a subsequent communication, a transmission configuration for the subsequent communication, beam management of one or more of a receive beam or a transmit beam of the repeater node, or an association of the repeater node with one or more wireless communication devices.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
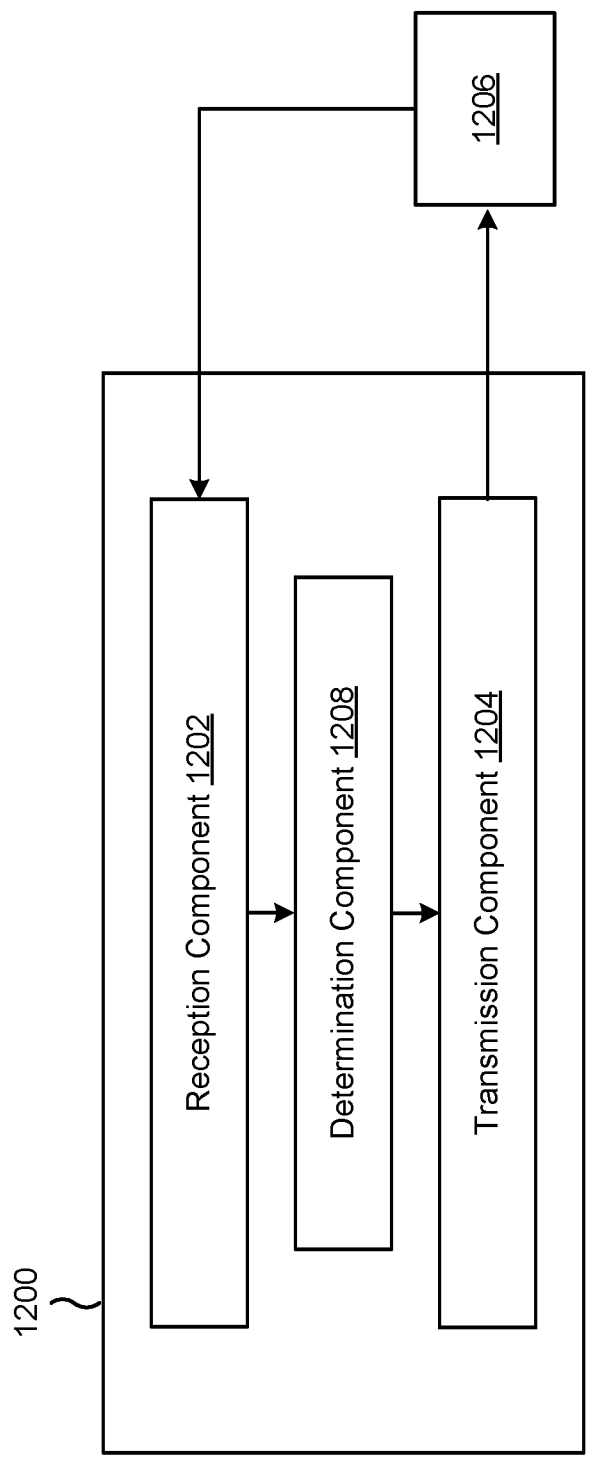

FIG. 12 is a block diagram of an example apparatus 1200 for wireless communication. The apparatus 1200 may be a control node, or a control node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component.

In some aspects, the apparatus 1200 may be configured to perform one or more operations described herein in connection with FIGS. 3-6. Additionally or alternatively, the apparatus 1200 may be configured to perform one or more processes described herein, such as process 900 of FIG. 9. In some aspects, the apparatus 1200 and/or one or more components shown in FIG. 12 may include one or more components of the control node described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the control node described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the control node described above in connection with FIG. 2. In some aspects, the transmission component 1204 may be co-located with the reception component 1202 in a transceiver.

The transmission component 1204 may transmit, to a repeater node, an indication of a configuration for generation of a second signal that includes repeater node pilots and a first signal to be forwarded to a receiver node or the control node. The determination component 1110 may determine a channel estimate of a transmission channel of the repeater node based at least in part on the repeater node pilots. In some aspects, the determination component 1110 may include one or more antennas, a demodulator, a MIMO detector, a receive processor, a modulator, a transmit MIMO processor, a transmit processor, a controller/processor, a memory, or a combination thereof, of the control node described above in connection with FIG. 2.

The reception component 1202 may receive the second signal, wherein determination of the channel estimate of the transmission channel of the repeater node is based at least in part on reception of the second signal. The reception component 1202 may receive, from a receiver node to which the repeater node forwards the second signal, feedback that is based at least in part on the repeater node pilots, wherein determination of the channel estimate of the transmission channel of the repeater node is based at least in part on the feedback that is based at least in part on the repeater node pilots.

The transmission component 1204 may transmit, to the repeater node and based at least in part on the channel estimate, one or more of an indication of scheduling for a subsequent communication, a transmission configuration for the subsequent communication, beam management of one or more of a receive beam or a transmit beam of the repeater node, or an association of the repeater node with one or more wireless communication devices.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
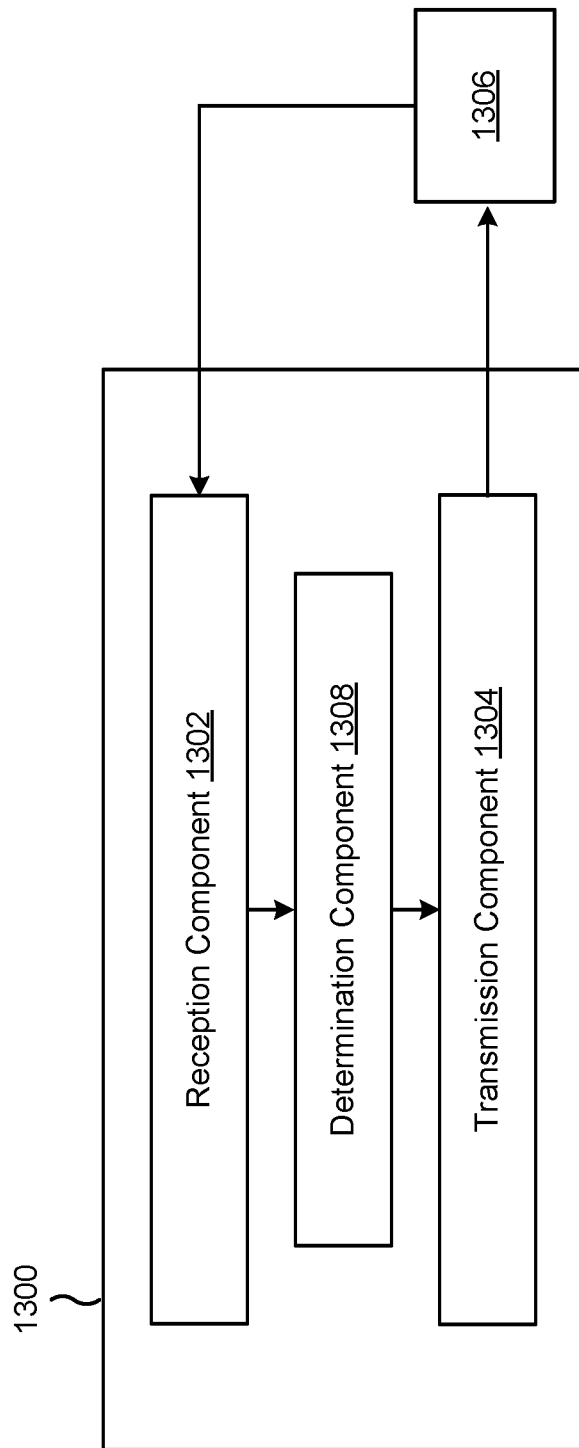

FIG. 13 is a block diagram of an example apparatus 1300 for wireless communication. The apparatus 1300 may be a repeater node, or a repeater node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a determination component 1308.

In some aspects, the apparatus 1300 may be configured to perform one or more operations described herein in connection with FIGS. 3-6. Additionally or alternatively, the apparatus 1300 may be configured to perform one or more processes described herein, such as process 1000 of FIG. 10. In some aspects, the apparatus 1300 and/or one or more components shown in FIG. 13 may include one or more components of the repeater node described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the repeater node described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the repeater node described above in connection with FIG. 2. In some aspects, the transmission component 1304 may be co-located with the reception component 1302 in a transceiver.

The reception component 1302 may receive, from a repeater node, a second signal that includes a first signal with repeater node pilots. The determination component 1308 may determine a channel estimate of a transmission channel of the repeater node based at least in part on the repeater node pilots. In some aspects, the determination component 1308 may include one or more antennas, a demodulator, a MIMO detector, a receive processor, a modulator, a transmit MIMO processor, a transmit processor, a controller/processor, a memory, or a combination thereof, of the repeater node described above in connection with FIG. 2.

The reception component 1302 may receive, from a control node, an indication of a configuration of the second signal wherein determination of the channel estimate is based at least in part on the configuration.

The reception component 1302 may receive, from a control node and based at least in part on the channel estimate, one or more of an indication of scheduling for a subsequent communication from the repeater node, or a transmission configuration for the subsequent communication from the repeater node.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

In some wireless networks, a repeater node may forward uplink, downlink, or side-link communications between wireless nodes. For example, the repeater node may forward communications between a control node and a first wireless node (e.g., a UE), between a first wireless node and a second wireless node, and/or the like. The communications may include pilots, such as demodulation reference signals, phase tracking reference signals, and/or the like that are inserted by a transmitter node. A receiver node may attempt to estimate an effective channel between the transmitter node and the receiver node, which includes multiple hops involving the repeater node. However, the effective channel may be difficult to estimate based at least in part on the multiple hops having different effects on the communications. In some aspects, attempting to estimate the effective channel in a single step may consume computing and communication resources of the receiver node. Additionally, or alternatively, the transmitter node may transmit the communications with a relatively high density of pilots to facilitate the attempt to estimate the effective channel, which may consume network resources. Further, a control node may be unaware of a channel estimate of a reception channel of the repeater node, which may result in an inefficient configuration of reception parameters of the repeater node.

In some aspects described herein, a repeater node may receive a first signal from a transmitter node (e.g., a base station, a UE, a control node, and/or the like). The first signal may include a second signal and repeater node pilots, the second signal for forwarding to a receiver node (e.g., a base station, a UE, a control node, and/or the like). The repeater node may extract the repeater node pilots when forwarding the second signal. In some aspects, the repeater node may determine a channel estimate of a reception channel of the repeater node based at least in part on the repeater node pilots. For example, the repeater node may determine the channel estimate as part of performing processing operations (e.g., as described with reference to reference number 510 and 512). In some aspects, the repeater node may transmit feedback (e.g., an indication of the channel estimate, the first message that includes the repeater node pilots, and/or the like) to the control node.

In this way, the control node may determine a channel estimate of the reception channel of the repeater node. The control node may configure the repeater node for subsequent communications based at least in part on the repeater node pilots, a channel estimate of the reception channel of the repeater node, and/or the like. This may improve spectrum efficiency and/or reduce error rates of communications transmitted via the repeater node, which may conserve computing, power, communication, and network resources.

Figure 14:
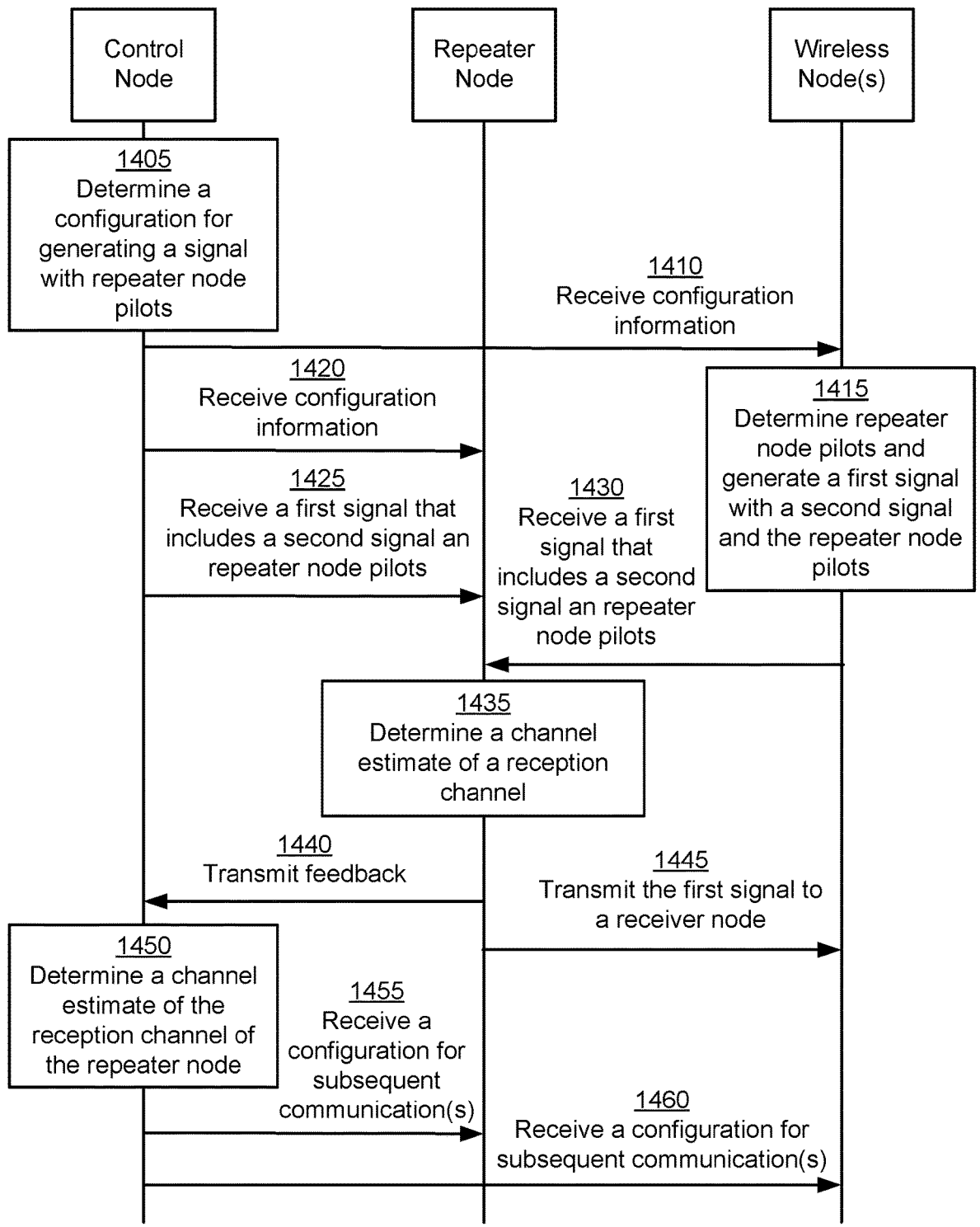
FIG. 14 as a diagram illustrating one or more examples associated with techniques for adding repeater node pilots to a signal to be forwarded by a repeater node, in accordance with the present disclosure.

FIG. 14 is a diagram illustrating an example 1400 associated with techniques for adding repeater node pilots to a signal to be forwarded by a repeater node, in accordance with the present disclosure. As shown in FIG. 14, a control node (e.g., a base station 110) may communicate with a repeater node (e.g., a base station 110) and/or one or more wireless nodes. The one or more wireless nodes may include a transmitter node, a receiver node, and/or the like. The control node, the repeater node, and the one or more wireless nodes may be part of a wireless network (e.g., wireless network 100). In some aspects, the control node and the receiver node may be a same device or may be co-located devices. In some aspects, the control node and the transmitter node may be a same device or may be co-located devices.

As shown by reference number 1405, the control node may determine a configuration for generating a signal with repeater node pilots. In some aspects (e.g., when the control node is a transmitter node for communication with a receiver node), the control node may use the configuration to generate a first signal that includes a second signal and the repeater node pilots.

In some aspects, the configuration may indicate to generate the first signal based at least in part on frequency-domain multiplexing the repeater node pilots with the second signal, time-domain multiplexing the repeater node pilots with the second signal, interleaving the repeater node pilots with the second signal in one or more of a time domain or a frequency domain, and/or the like. In some aspects, the configuration information may indicate to transmit the repeater node pilots on frequency tones that are adjacent to tones used to carry the second signal. In some aspects, the configuration information may indicate to transmit the repeater node pilots within one or more symbols that are adjacent to the symbols used to carry the first signal.

As shown by reference number 1410, at least one of the one or more wireless nodes (e.g., a transmitter node) may receive configuration information from the control node. In some aspects, the transmitter node may receive an indication of a configuration for generation of a first signal that includes repeater node pilots and a second signal to be forwarded by the repeater node to the receiver node or the control node.

As shown by reference number 1415, at least one of the one or more wireless nodes (e.g., the transmitter node) may determine repeater node pilots and generate the first signal that includes the second signal and the repeater node pilots. In some aspects, the transmitter node may determine the repeater node pilots (e.g., a configuration for combining the repeater node pilots with the second signal) based at least in part on the configuration information received from the control node. In some aspects, the second signal may be intended for forwarding by the repeater node to a receiver node (e.g., the control node or a receiver node of the one or more wireless nodes). In some aspects, the repeater node pilots may be configured for determination of a reception channel of the repeater node.

In some aspects, the transmitter node (e.g., an IAB node, a UE, and/or the like) may transmit the second signal as an uplink communication. In some aspects, the transmitter node (e.g., an IAB node, a base station, the control node, and/or the like) may transmit the second signal as a downlink communication.

As shown by reference number 1420, the repeater node may receive configuration information from the control node. In some aspects, the repeater node may receive an indication of a configuration for reception of a signal that includes repeater node pilots and a received signal to be forwarded to the receiver node or the control node. In some aspects, the configuration information may indicate a configuration of how the received signal is to be combined with the repeater node pilots by a transmitter node or the control node. In some aspects, the configuration information may indicate a configuration of how to perform channel estimation using the repeater node pilots, how to provide feedback to the control node based at least in part on the pilots, and/or the like.

As shown by reference number 1425, the repeater node may receive, from the control node, the first signal that includes the repeater node pilots and the second signal for forwarding to a receiver node. As shown by reference number 1430, the repeater node may receive, from the one or more wireless nodes (e.g., a transmitter node), the first signal that includes the repeater node pilots and the second signal for forwarding to a receiver node or the control node. In some aspects, the repeater node may receive the first signal using beamforming. In some aspects, the repeater node may receive the first signal using a millimeter wave frequency.

In some aspects, the repeater node may receive the second signal from a UE (e.g., of the one or more wireless nodes), a base station (e.g., an IAB node of the one or more wireless nodes), and/or the like as an uplink communication. In some aspects, the repeater node may receive the first signal from the control node, a base station (e.g., an IAB node of the one or more wireless nodes), and/or the like as a downlink communication.

As shown by reference number 1435, the repeater node may determine a channel estimate of a reception channel of the repeater node. In some aspects, the repeater node may determine the channel estimate of the reception channel of the repeater node based at least in part on the repeater node pilots. For example, the repeater node may extract the repeater node pilots from the first signal based at least in part on the configuration information received from the control node, and may estimate the reception channel of the repeater node based at least in part on measurements of the repeater node pilots.

In some aspects, the repeater node may generate feedback for the control node that is based at least in part on the repeater node pilots. In some aspects, the feedback may include an indication of measurements of the repeater node pilots, the channel estimate of the reception channel, and/or the like.

As shown by reference number 1440, the repeater node may transmit the feedback to the control node. In some aspects, the repeater node may transmit the feedback to the control node via a shared channel communication, a control channel communication, and/or the like.

As shown by reference number 1445, the repeater node may transmit the second signal to a receiver node of the one or more wireless nodes. In some aspects, the repeater node may transmit the second signal to the receiver node without the repeater node pilots. In some aspects, the repeater node may transmit the second signal to the receiver node after performing one or more processing operations (e.g., as described with reference to FIG. 5) on the second signal, such as channel estimation and equalization.

As shown by reference number 1450, the control node may determine a channel estimate of the reception channel of the repeater node. In some aspects, the control node may determine the channel estimate of the reception channel of the repeater node based at least in part on the repeater node pilots. In some aspects, the control node may determine the channel estimate based at least in part on reception of the first signal from the repeater node, reception of the feedback from the repeater node, and/or the like.

As shown by reference number 1455, the repeater node may receive a configuration for one or more subsequent communications. In some aspects, the control node may transmit the configuration for one or more subsequent communications based at least in part on the channel estimation of the reception channel of the repeater node. In some aspects, the configuration may indicate scheduling for a subsequent communication, a reception configuration for the subsequent communication, information for beam management of one or more of a receive beam or a transmit beam of the repeater node, an indication of an association of the repeater node with one or more wireless communication devices (e.g., transmitter nodes), and/or the like.

As shown by reference number 1460, the at least one wireless node (e.g., a transmitter node) may receive a configuration for one or more subsequent communications. In some aspects, the control node may transmit the configuration to the transmitter node to indicate a configuration of the repeater node (e.g., the configuration described with reference to reference number 1455). In some aspects, the configuration may indicate scheduling for a subsequent communication by the transmitter node to the repeater node, a reception configuration for the subsequent communication, information for beam management of one or more of a receive beam or a transmit beam of the repeater node, an indication of an association of the repeater node with one or more wireless communication devices (e.g., to indicate whether the at least one wireless node may access the one or more wireless communication devices via the repeater node), and/or the like.

Based at least in part on the repeater node receiving the first signal that includes the repeater node pilots, the repeater node may provide the feedback to the control node to enable the control node to determine the channel estimate of the reception channel of the repeater node. The control node may configure the repeater node for subsequent communications based at least in part on the repeater node pilots, a channel estimate of the reception channel of the repeater node, and/or the like. This may improve spectrum efficiency and/or reduce error rates of communications transmitted via the repeater node, which may conserve computing, power, communication, and network resources.

Figure 15:
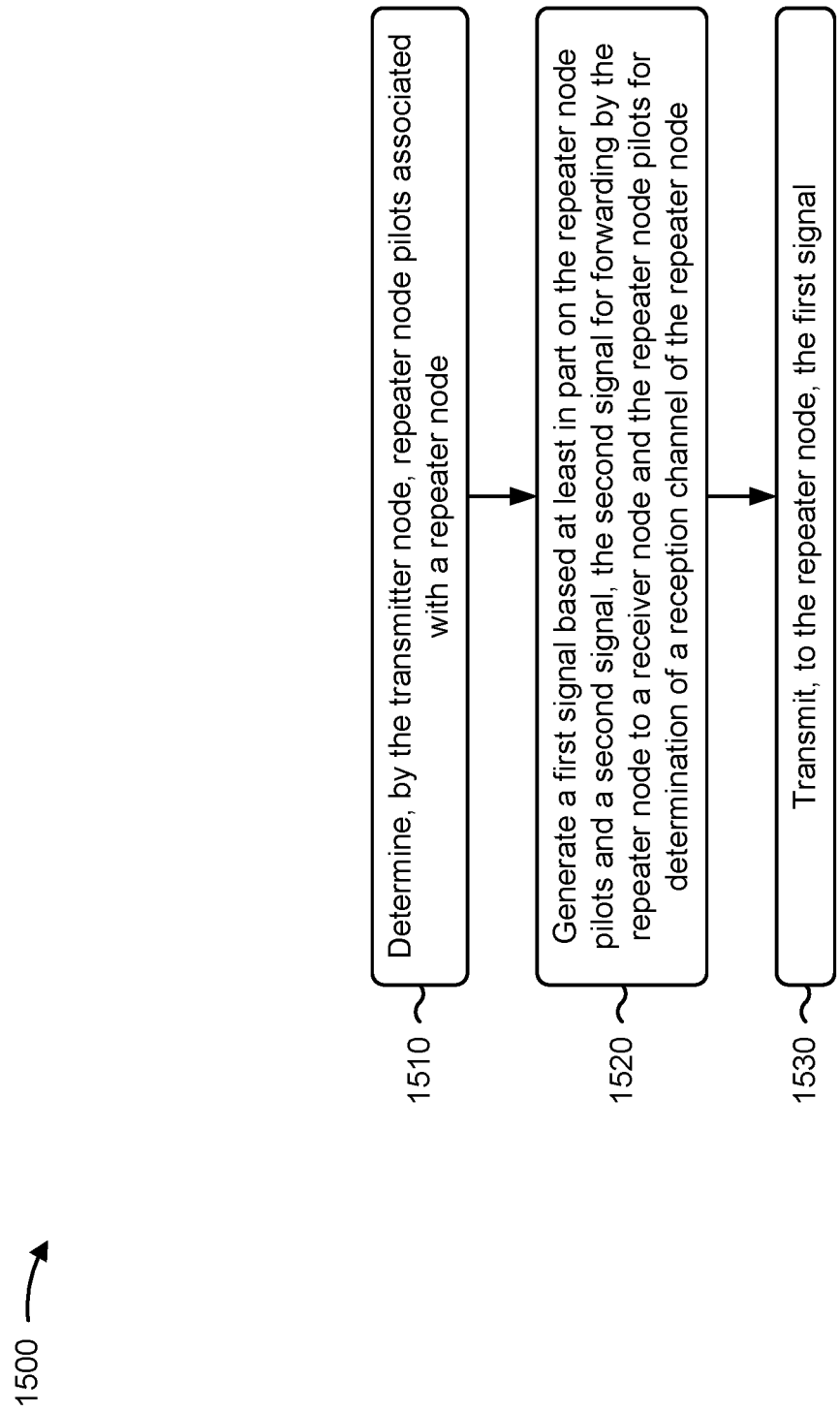
FIGS. 15-17 are diagrams illustrating example processes associated with techniques for adding repeater node pilots to a signal to be forwarded by a repeater node, in accordance with the present disclosure.

FIG. 15 is a diagram illustrating an example process 1500 performed, for example, by a transmitter node, in accordance with the present disclosure. Example process 1500 is an example where the transmitter node (e.g., base station 110, apparatus 1800 (described below), and/or the like) performs operations associated with techniques for adding repeater node pilots to a signal to be forwarded by a repeater node.

As shown in FIG. 15, in some aspects, process 1500 may include determining repeater node pilots associated with a repeater node (block 1510). For example, the transmitter node (e.g., using determination component 1010) may determine repeater node pilots associated with a repeater node, as described above.

As further shown in FIG. 15, in some aspects, process 1500 may include generating a first signal based at least in part on the repeater node pilots and a second signal, the second signal for forwarding by the repeater node to a receiver node and the repeater node pilots for determination of a reception channel of the repeater node (block 1520). For example, the transmitter node (e.g., using generation component 1808) may generate a first signal based at least in part on the repeater node pilots and a second signal, the second signal for forwarding by the repeater node to a receiver node and the repeater node pilots for determination of a reception channel of the repeater node, as described above.

As further shown in FIG. 15, in some aspects, process 1500 may include transmitting, to the repeater node, the first signal (block 1530). For example, the transmitter node (e.g., using transmission component 1804) may transmit, to the repeater node, the first signal, as described above.

Process 1500 may include additional aspects, such as any single aspect or any combination of aspects described below and/or in connection with one or more other processes described elsewhere herein.

In a first aspect, process 1500 includes receiving, from a control node, an indication of a configuration for generation of the first signal, wherein generation of the first signal is based at least in part on the configuration.

In a second aspect, alone or in combination with the first aspect, process 1500 includes receiving, from a control node and based at least in part on transmission of the first signal, one or more of an indication of scheduling for a subsequent communication, a reception configuration for the subsequent communication, information for beam management of one or more of a receive beam or a transmit beam of the repeater node, or an indication of an association of the repeater node with one or more wireless communication devices.

In a third aspect, alone or in combination with one or more of the first and second aspects, the second signal is an uplink communication or a downlink communication.

In a fourth aspect, alone or in combination with one or more of the first through third aspects, generation of the first signal comprises one or more of frequency-domain multiplexing of the repeater node pilots with the second signal, time-domain multiplexing of the repeater node pilots with the second signal, interleaving, in a time domain and a frequency domain, of the second signal and the repeater node pilots, or encoding of the second signal with the repeater node pilots.

In a fifth aspect, alone or in combination with one or more of the first through fourth aspects, transmission of the first signal comprises one or more of transmission of the first signal using beamforming, or transmission of the first signal using a millimeter wave frequency.

In a sixth aspect, alone or in combination with one or more of the first through fifth aspects, the transmitter node comprises a control node associated with the repeater node.

In a seventh aspect, alone or in combination with one or more of the first through sixth aspects, process 1500 includes receiving, from the repeater node or a control node, a measurement report that is based at least in part on the repeater node pilots.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
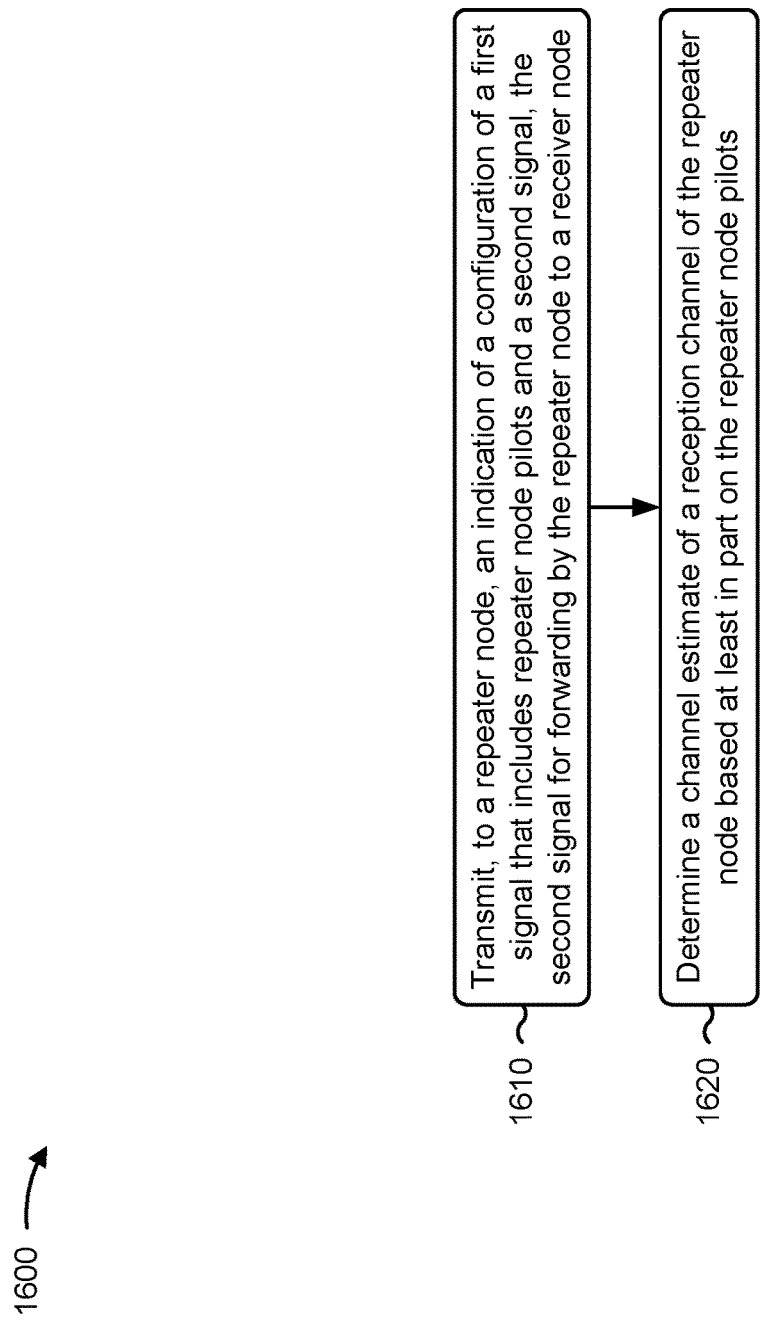

FIG. 16 is a diagram illustrating an example process 1600 performed, for example, by a control node, in accordance with the present disclosure. Example process 1600 is an example where the control node (e.g., base station 110, apparatus 1900 (described below), and/or the like) performs operations associated with techniques for adding repeater node pilots to a signal to be forwarded by a repeater node.

As shown in FIG. 16, in some aspects, process 1600 may include determining, for a repeater node, a configuration for reception of a first signal that includes repeater node pilots and a second signal, the second signal for forwarding by the repeater node to a received node (block 1610). For example, the control node (e.g., using determination component 1908) may determine, for a repeater node, a configuration for reception of a first signal that includes repeater node pilots and a second signal, the second signal for forwarding by the repeater node to a received node, as described above.

As further shown in FIG. 16, in some aspects, process 1600 may include transmitting, to the repeater node, an indication of the configuration (block 1620). For example, the control node (e.g., using transmission component 1904) may transmit, to the repeater node, an indication of the configuration, as described above.

Process 1600 may include additional aspects, such as any single aspect or any combination of aspects described below and/or in connection with one or more other processes described elsewhere herein.

In a first aspect, process 1600 includes determining a channel estimate of a reception channel of the repeater node based at least in part on the repeater node pilots.

In a second aspect, alone or in combination with the first aspect, process 1600 includes one or more of transmitting the first signal, or transmitting, to a transmitter node, an indication of a configuration for transmission of the first signal.

In a third aspect, alone or in combination with one or more of the first and second aspects, process 1600 includes receiving, from the repeater node, feedback associated with the repeater node pilots, determination of the channel estimate of the reception channel of the repeater node is based at least in part on reception of the feedback.

In a fourth aspect, alone or in combination with one or more of the first through third aspects, process 1600 includes transmitting additional feedback, based at least in part on the feedback associated with the repeater node pilots, to a transmitter node.

In a fifth aspect, alone or in combination with one or more of the first through fourth aspects, process 1600 includes transmitting, to one or more of the repeater node or a transmitter node and based at least in part on determination of the channel estimate of the reception channel of the repeater node, one or more of an indication of scheduling for a subsequent communication, a reception configuration for the subsequent communication, information for beam management of one or more of a receive beam or a transmit beam of the repeater node, or an indication of an association of the repeater node with one or more wireless communication devices.

In a sixth aspect, alone or in combination with one or more of the first through fifth aspects, the second signal is an uplink communication or a downlink communication.

In a seventh aspect, alone or in combination with one or more of the first through sixth aspects, the first signal comprises frequency-domain multiplexing of the repeater node pilots with the second signal, time-domain multiplexing of the repeater node pilots with the second signal, or node pilots interleaved with the second signal in one or more of a time domain or a frequency domain.

In an eighth aspect, alone or in combination with one or more of the first through seventh aspects, the control node comprises a transmitter node or the receiver node.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
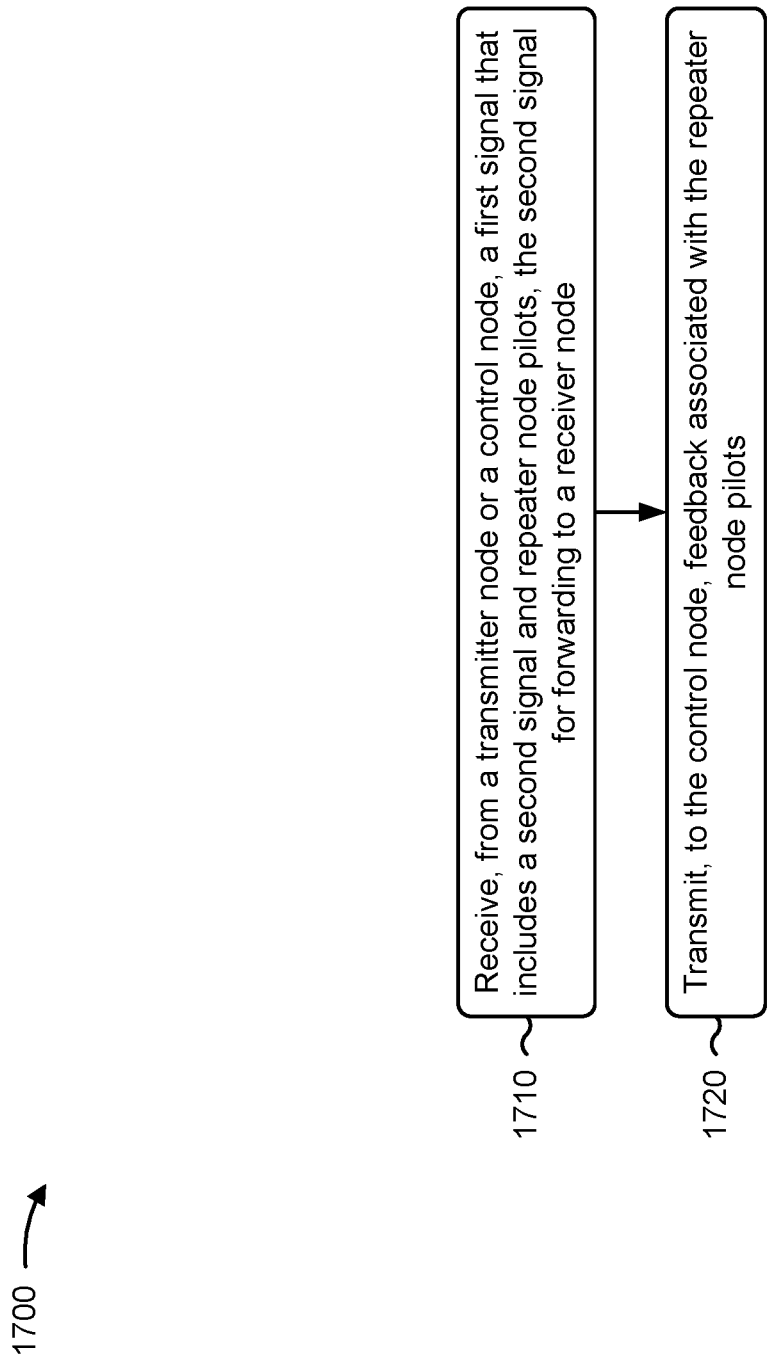

FIG. 17 is a diagram illustrating an example process 1700 performed, for example, by a repeater node, in accordance with the present disclosure. Example process 1700 is an example where the repeater node (e.g., base station 110, apparatus 2000 (described below), and/or the like) performs operations associated with techniques for adding repeater node pilots to a signal to be forwarded by a repeater node.

As shown in FIG. 17, in some aspects, process 1700 may include receiving, from a transmitter node or a control node, a first signal that includes a second signal and repeater node pilots, the second signal for forwarding to a receiver node (block 1710). For example, the repeater node (e.g., using reception component 2002) may receive, from a transmitter node or a control node, a first signal that includes a second signal and repeater node pilots, the second signal for forwarding to a receiver node, as described above.

As further shown in FIG. 17, in some aspects, process 1700 may include measuring the repeater node pilots to obtain one or more of a measurement value or a channel estimation of a reception channel of the repeater node (block 1720). For example, the repeater node (e.g., using determination component 2008) may measure the repeater node pilots to obtain one or more of a measurement value or a channel estimation of a reception channel of the repeater node, as described above.

As further shown in FIG. 17, in some aspects, process 1700 may include transmitting the second signal to the receiver node (block 1730). For example, the repeater node (e.g., using transmission component 2004) may transmit the second signal to the receiver node, as described above.

Process 1700 may include additional aspects, such as any single aspect or any combination of aspects described below and/or in connection with one or more other processes described elsewhere herein.

In a first aspect, process 1700 includes transmitting, to the control node or the transmitter node, feedback associated with the repeater node pilots.

In a second aspect, alone or in combination with the first aspect, the feedback associated with the repeater node pilots indicates the channel estimate of the reception channel of the repeater node.

In a third aspect, alone or in combination with one or more of the first and second aspects, process 1700 includes receiving, from the control node and at least in part on the feedback associated with the repeater node pilots, one or more of an indication of scheduling for a subsequent communication, a reception configuration for the subsequent communication, information for beam management of one or more of a receive beam or a transmit beam of the repeater node, or an indication of an association of the repeater node with one or more wireless communication devices.

In a fourth aspect, alone or in combination with one or more of the first through third aspects, process 1700 includes receiving, from the control node, an indication of a configuration of the first signal, wherein the feedback associated with the repeater node pilots is based at least in part on the configuration.

In a fifth aspect, alone or in combination with one or more of the first through fourth aspects, the second signal is an uplink communication or a downlink communication.

In a sixth aspect, alone or in combination with one or more of the first through fifth aspects, the first signal comprises one or more of frequency-domain multiplexing of the repeater node pilots with the second signal, time-domain multiplexing of the repeater node pilots with the second signal, or node pilots interleaved with the second signal in one or more of a time domain or a frequency domain.

In a seventh aspect, alone or in combination with one or more of the first through sixth aspects, reception of the first signal comprises one or more of reception of the first signal using beamforming, or reception of the first signal using a millimeter wave frequency.

In an eighth aspect, alone or in combination with one or more of the first through seventh aspects, the control node comprises the transmitter node or the receiver node.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
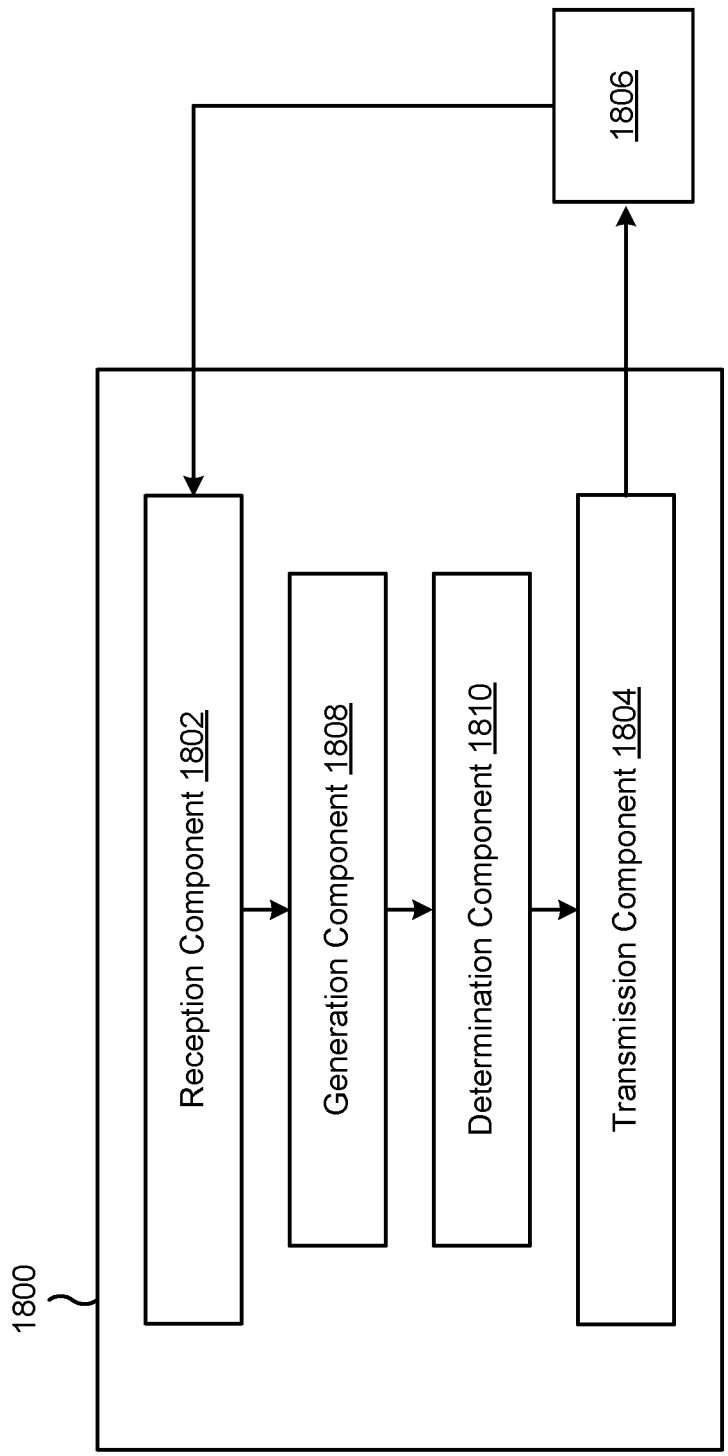
FIGS. 18-20 are block diagrams of example apparatuses for wireless communication, in accordance with the present disclosure.

FIG. 18 is a block diagram of an example apparatus 1800 for wireless communication. The apparatus 1800 may be a transmitter node, or a transmitter node may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include one or more of a generation component 1808, or a determination component 1810, among other examples.

In some aspects, the apparatus 1800 may be configured to perform one or more operations described herein in connection with FIGS. 3-7 and/or 14. Additionally or alternatively, the apparatus 1800 may be configured to perform one or more processes described herein, such as process 1500 of FIG. 15. In some aspects, the apparatus 1800 and/or one or more components shown in FIG. 18 may include one or more components of the transmitter node described above in connection with FIG. 2. Additionally, or alternatively, one or more components shown in FIG. 18 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may include one or more antennas, a demodulator, a MIMO detector, a receive processor, a controller/processor, a memory, or a combination thereof, of the transmitter node described above in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the transmitter node described above in connection with FIG. 2. In some aspects, the transmission component 1804 may be collocated with the reception component 1802 in a transceiver.

The determination component 1810 may determine repeater node pilots associated with a repeater node. In some aspects, the determination component 1810 may include one or more antennas, a demodulator, a MIMO detector, a receive processor, a modulator, a transmit MIMO processor, a transmit processor, a controller/processor, a memory, or a combination thereof, of the transmitter node described above in connection with FIG. 2. The generation component 1808 may generate a first signal based at least in part on the repeater node pilots and a second signal, the second signal for forwarding by the repeater node to a receiver node and the repeater node pilots for determination of a reception channel of the repeater node. In some aspects, the generation component 1808 may include one or more antennas, a demodulator, a MIMO detector, a receive processor, a modulator, a transmit MIMO processor, a transmit processor, a controller/processor, a memory, or a combination thereof, of the transmitter node described above in connection with FIG. 2. The transmission component 1804 may transmit, to the repeater node, the first signal.

The reception component 1802 may receive, from a control node, an indication of a configuration for generation of the first signal, wherein generation of the first signal is based at least in part on the configuration.

The reception component 1802 may receive, from a control node and based at least in part on transmission of the first signal, one or more of an indication of scheduling for a subsequent communication, a reception configuration for the subsequent communication, information for beam management of one or more of a receive beam or a transmit beam of the repeater node, or an indication of an association of the repeater node with one or more wireless communication devices.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally or alternatively, a set of (one or more) components shown in FIG. 18 may perform one or more functions described as being performed by another set of components shown in FIG. 18.

Figure 19:
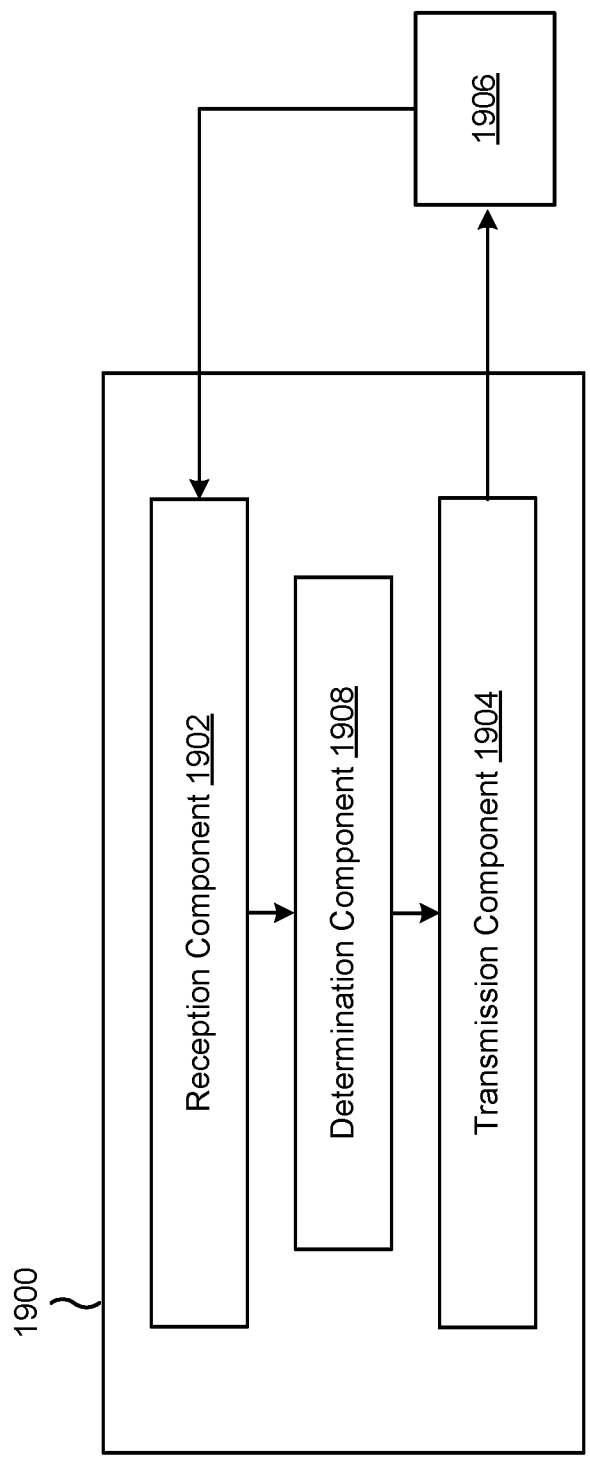

FIG. 19 is a block diagram of an example apparatus 1900 for wireless communication. The apparatus 1900 may be a control node, or a control node may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include a determination component 1908.

In some aspects, the apparatus 1900 may be configured to perform one or more operations described herein in connection with FIGS. 3-7 and/or 14. Additionally or alternatively, the apparatus 1900 may be configured to perform one or more processes described herein, such as process 1600 of FIG. 16. In some aspects, the apparatus 1900 and/or one or more components shown in FIG. 19 may include one or more components of the control node described above in connection with FIG. 2. Additionally, or alternatively, one or more components shown in FIG. 19 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1906. In some aspects, the reception component 1902 may include one or more antennas, a demodulator, a MIMO detector, a receive processor, a controller/processor, a memory, or a combination thereof, of the control node described above in connection with FIG. 2.

The transmission component 1904 may transmit communications, such as reference signals, control information, data communications, or a combination thereof, to the apparatus 1906. In some aspects, one or more other components of the apparatus 1906 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the control node described above in connection with FIG. 2. In some aspects, the transmission component 1904 may be collocated with the reception component 1902 in a transceiver.

The transmission component 1904 may transmit, to a repeater node, an indication of a configuration of a first signal that includes repeater node pilots and a second signal, the second signal for forwarding by the repeater node to a receiver node. The determination component 1908 may determine a channel estimate of a reception channel of the repeater node based at least in part on the repeater node pilots. In some aspects, the determination component 1908 may include one or more antennas, a demodulator, a MIMO detector, a receive processor, a modulator, a transmit MIMO processor, a transmit processor, a controller/processor, a memory, or a combination thereof, of the control node described above in connection with FIG. 2.

The reception component 1902 may receive, from the repeater node, feedback associated with the repeater node pilots, wherein determination of the channel estimate of the reception channel of the repeater node is based at least in part on reception of the feedback.

The transmission component 1904 may transmit, to one or more of the repeater node or a transmitter node and based at least in part on determination of the channel estimate of the reception channel of the repeater node, one or more of an indication of scheduling for a subsequent communication, a reception configuration for the subsequent communication, information for beam management of one or more of a receive beam or a transmit beam of the repeater node, or an indication of an association of the repeater node with one or more wireless communication devices.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally or alternatively, a set of (one or more) components shown in FIG. 19 may perform one or more functions described as being performed by another set of components shown in FIG. 19.

Figure 20:
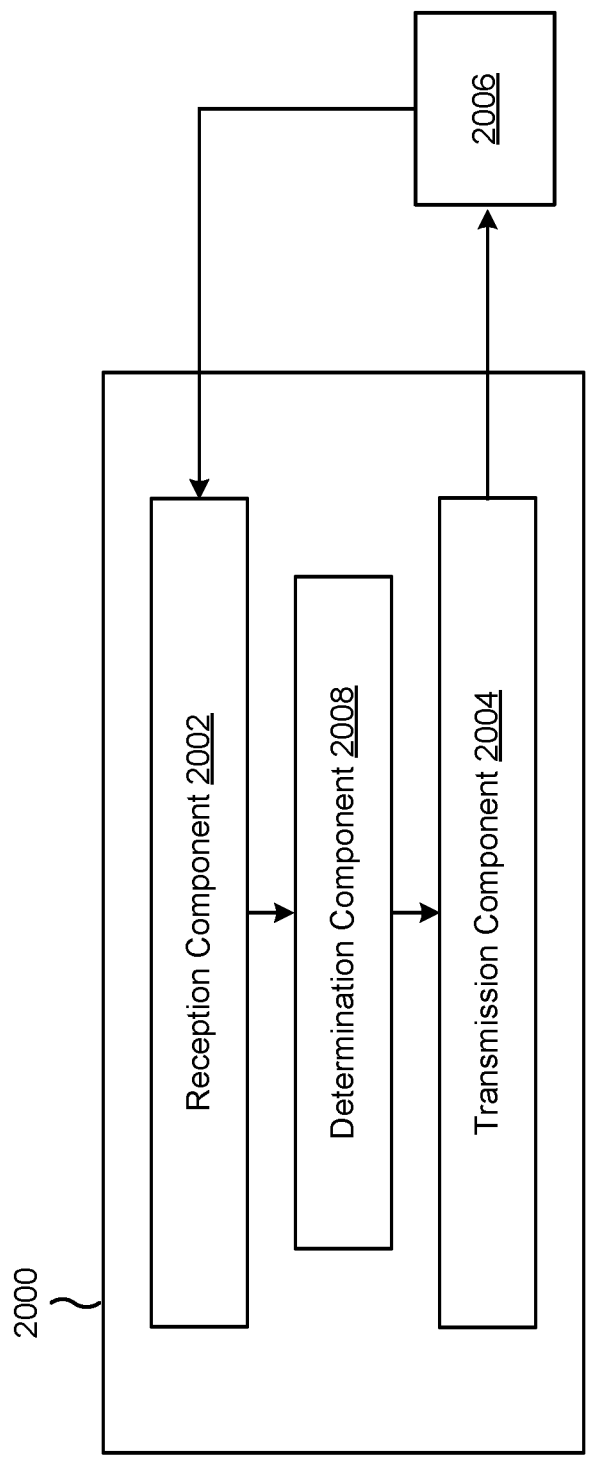

FIG. 20 is a block diagram of an example apparatus 2000 for wireless communication. The apparatus 2000 may be a repeater node, or a repeater node may include the apparatus 2000. In some aspects, the apparatus 2000 includes a reception component 2002 and a transmission component 2004, which may be in communication with one another (for example, via one or more buses and/or one or more other components). As shown, the apparatus 2000 may communicate with another apparatus 2006 (such as a UE, a base station, or another wireless communication device) using the reception component 2002 and the transmission component 2004. As further shown, the apparatus 2000 may include a determination component 2008.

In some aspects, the apparatus 2000 may be configured to perform one or more operations described herein in connection with FIGS. 3-7 and/or 14. Additionally or alternatively, the apparatus 2000 may be configured to perform one or more processes described herein, such as process 1700 of FIG. 17. In some aspects, the apparatus 2000 and/or one or more components shown in FIG. 20 may include one or more components of the repeater node described above in connection with FIG. 2. Additionally, or alternatively, one or more components shown in FIG. 20 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2002 may receive communications, such as reference signals, control information, data communications, or a combination thereof, from the apparatus 2006. The reception component 2002 may provide received communications to one or more other components of the apparatus 2000. In some aspects, the reception component 2002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2006. In some aspects, the reception component 2002 may include one or more antennas, a demodulator, a MIMO detector, a receive processor, a controller/processor, a memory, or a combination thereof, of the repeater node described above in connection with FIG. 2.

The transmission component 2004 may transmit communications, such as reference signals, control information, data communications, or a combination thereof, to the apparatus 2006. In some aspects, one or more other components of the apparatus 2006 may generate communications and may provide the generated communications to the transmission component 2004 for transmission to the apparatus 2006. In some aspects, the transmission component

2004 may perform signal processing on the generated communications (such as filtering, amplification, modulation, digital-to-analog conversion, multiplexing, interleaving, mapping, or encoding, among other examples), and may transmit the processed signals to the apparatus 2006. In some aspects, the transmission component 2004 may include one or more antennas, a modulator, a transmit MIMO processor, a transmit processor, a controller/processor, a memory, or a combination thereof, of the repeater node described above in connection with FIG. 2. In some aspects, the transmission component 2004 may be collocated with the reception component 2002 in a transceiver.

The reception component 2002 may receive, from a transmitter node or a control node, a first signal that includes a second signal and repeater node pilots, the second signal for forwarding to a receiver node. The transmission component 2004 may transmit, to the control node, feedback associated with the repeater node pilots.

The determination component 2008 may determine a channel estimate of a reception channel of the repeater node based at least in part on the repeater node pilots, wherein the feedback associated with the repeater node pilots indicates the channel estimate. In some aspects, the determination component 2008 may include one or more antennas, a demodulator, a MIMO detector, a receive processor, a modulator, a transmit MIMO processor, a transmit processor, a controller/processor, a memory, or a combination thereof, of the repeater node described above in connection with FIG. 2.

The reception component 2002 may receive, from the control node, an indication of a configuration of the first signal, wherein the feedback associated with the repeater node pilots is based at least in part on the configuration.

The reception component 2002 may receive, from a control node and at least in part on the feedback associated with the repeater node pilots, one or more of an indication of scheduling for a subsequent communication, a reception configuration for the subsequent communication, information for beam management of one or more of a receive beam or a transmit beam of the repeater node, or an indication of an association of the repeater node with one or more wireless communication devices.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally or alternatively, a set of (one or more) components shown in FIG. 20 may perform one or more functions described as being performed by another set of components shown in FIG. 20.

The following provides an overview of some Aspects of the present disclosure:

Aspect 1: A method of wireless communication performed by a repeater node, comprising: receiving a first signal to be forwarded to a receiver node or a control node; generating a second signal that includes repeater node pilots and the first signal to be forwarded to the receiver node or the control node; and transmitting, to the receiver node or the control node, the second signal.

Aspect 2: The method of Aspect 1, further comprising: receiving, from the control node, an indication of a configuration for generation of the second signal, wherein generation of the second signal is based at least in part on the configuration.

Aspect 3: The method of any of Aspects 1-2, further comprising: receiving, from the control node and based at least in part on transmitting the second signal, one or more of: an indication of scheduling for a subsequent communication, a transmission configuration for the subsequent communication, beam management of one or more of a receive beam or a transmit beam of the repeater node, or an association of the repeater node with one or more wireless communication devices.

Aspect 4: The method of any of Aspects 1-3, wherein the first signal comprises an uplink communication or a downlink communication.

Aspect 5: The method of any of Aspects 1-4, wherein generation of the second signal comprises: frequency-domain multiplexing of the repeater node pilots with the first signal, time-domain multiplexing of the repeater node pilots with the first signal, or decoding of the first signal and reencoding of the first signal with the repeater node pilots interleaved within resources that carry the first signal.

Aspect 6: A method of wireless communication performed by a control node, comprising: determining, for a repeater node, a configuration for generation of a second signal that includes repeater node pilots and a first signal to be forwarded to a receiver node or the control node; and transmitting, to the repeater node, an indication of the configuration.

Aspect 7: The method of Aspect 6, further comprising: determining a channel estimate of a transmission channel of the repeater node based at least in part on the repeater node pilots.

Aspect 8: The method of Aspect 7, further comprising: receiving the second signal, wherein determination of the channel estimate of the transmission channel of the repeater node is based at least in part on reception of the second signal.

Aspect 9: The method of any of Aspects 7-8, further comprising: receiving, from a receiver node to which the repeater node forwards the second signal, feedback that is based at least in part on the repeater node pilots, wherein determination of the channel estimate of the transmission channel of the repeater node is based at least in part on the feedback that is based at least in part on the repeater node pilots.

Aspect 10: The method of any of Aspects 7-9, further comprising: transmitting, to the repeater node and based at least in part on the channel estimate, one or more of: an indication of scheduling for a subsequent communication, a transmission configuration for the subsequent communication, beam management of one or more of a receive beam or a transmit beam of the repeater node, or an association of the repeater node with one or more wireless communication devices.

Aspect 11: The method of any of Aspects 6-10, wherein the first signal comprises an uplink communication or a downlink communication.

Aspect 12: The method of any of Aspects 6-11, wherein the configuration for generation of the second signal indicates to perform one or more of: frequency-domain multiplexing of the repeater node pilots with the first signal, time-domain multiplexing of the repeater node pilots with the first signal, or decoding of the first signal and reencoding of the first signal with the repeater node pilots.

Aspect 13: The method of any of Aspects 6-12, further comprising: transmitting, to a receiver node, an additional indication of the configuration.

Aspect 14: The method of any of Aspects 6-13, wherein the control node comprises: the receiver node, or a transmitter node that transmits the first signal to the control node.

Aspect 15: A method of wireless communication performed by a receiver node, comprising: receiving, from a repeater node, a second signal that includes a first signal with repeater node pilots; and determining a channel estimate of a transmission channel of the repeater node based at least in part on the repeater node pilots.

Aspect 16: The method of Aspect 15, further comprising: receiving, from a control node, an indication of a configuration of the second signal, wherein determination of the channel estimate is based at least in part on the configuration.

Aspect 16: The method of any of Aspects 15-16, further comprising: receiving, from a control node and based at least in part on the channel estimate, one or more of: an indication of scheduling for a subsequent communication from the repeater node, or a transmission configuration for the subsequent communication from the repeater node.

Aspect 18: The method of any of Aspects 15-17, wherein the first signal comprises an uplink communication or a downlink communication.

Aspect 19: The method of any of Aspects 15-18, wherein the second signal comprises one or more of: frequency-domain multiplexing of the repeater node pilots with the first signal, time-domain multiplexing of the repeater node pilots with the first signal, or repeater node pilots interleaved with the first signal in one or more of a time domain or a frequency domain.

Aspect 20: A method of wireless communication performed by a transmitter node, comprising: determining, by the transmitter node, repeater node pilots associated with a repeater node; generating a first signal based at least in part on the repeater node pilots and a second signal, the second signal for forwarding by the repeater node to a receiver node and the repeater node pilots for determination of a reception channel of the repeater node; and transmitting, to the repeater node, the first signal.

Aspect 21: The method of Aspect 20, further comprising: receiving, from a control node, an indication of a configuration for generation of the first signal, wherein generation of the first signal is based at least in part on the configuration.

Aspect 22: The method of any of Aspects 20-21, further comprising: receiving, from a control node and based at least in part on transmission of the first signal, one or more of: an indication of scheduling for a subsequent communication, a reception configuration for the subsequent communication, information for beam management of one or more of a receive beam or a transmit beam of the repeater node, or an indication of an association of the repeater node with one or more wireless communication devices.

Aspect 23: The method of any of Aspects 20-22, wherein the second signal is an uplink communication or a downlink communication.

Aspect 24: The method of any of Aspects 20-23, wherein generation of the first signal comprises one or more of: frequency-domain multiplexing of the repeater node pilots with the second signal, time-domain multiplexing of the repeater node pilots with the second signal, interleaving, in a time domain and a frequency domain, of the second signal and the repeater node pilots, or encoding of the second signal with the repeater node pilots.

Aspect 25: The method of any of Aspects 20-24, wherein transmission of the first signal comprises one or more of: transmission of the first signal using beamforming, or transmission of the first signal using a millimeter wave frequency.

Aspect 26: The method of any of Aspects 20-25, wherein the transmitter node comprises a control node associated with the repeater node.

Aspect 27: The method of any of Aspects 20-26, further comprising: receiving, from the repeater node or a control node, a measurement report that is based at least in part on the repeater node pilots.

Aspect 28: A method of wireless communication performed by a control node, comprising: determining, for a repeater node, a configuration for reception of a first signal that includes repeater node pilots and a second signal, the second signal for forwarding by the repeater node to a received node; and transmitting, to the repeater node, an indication of the configuration.

Aspect 29: The method of Aspect 28, further comprising: determining a channel estimate of a reception channel of the repeater node based at least in part on the repeater node pilots.

Aspect 30: The method of any of Aspects 28-29, further comprising one or more of: transmitting the first signal; or transmitting, to a transmitter node, an indication of a configuration for transmission of the first signal.

Aspect 31: The method of any of Aspects 28-30, further comprising: receiving, from the repeater node, feedback associated with the repeater node pilots, wherein determination of the channel estimate of the reception channel of the repeater node is based at least in part on reception of the feedback.

Aspect 32: The method of Aspect 31, further comprising: transmitting additional feedback, based at least in part on the feedback associated with the repeater node pilots, to a transmitter node.

Aspect 33: The method of any of Aspects 28-32, further comprising: transmitting, to one or more of the repeater node or a transmitter node and based at least in part on determination of the channel estimate of the reception channel of the repeater node, one or more of: an indication of scheduling for a subsequent communication, a reception configuration for the subsequent communication, information for beam management of one or more of a receive beam or a transmit beam of the repeater node, or an indication of an association of the repeater node with one or more wireless communication devices.

Aspect 34: The method of Aspect 33, wherein the second signal is an uplink communication or a downlink communication.

Aspect 35: The method of any of Aspects 33-34, wherein the first signal comprises: frequency-domain multiplexing of the repeater node pilots with the second signal, time-domain multiplexing of the repeater node pilots with the second signal, or repeater node pilots interleaved with the second signal in one or more of a time domain or a frequency domain.

Aspect 36: The method of any of Aspects 33-35, wherein the control node comprises a transmitter node or the receiver node.

Aspect 37: A method of wireless communication performed by a repeater node, comprising: receiving, from a transmitter node or a control node, a first signal that includes a second signal and repeater node pilots, the second signal for forwarding to a receiver node; and measuring the repeater node pilots to obtain one or more of a measurement value or a channel estimation of a reception channel of the repeater node; and transmitting the second signal to the receiver node.

Aspect 38: The method of Aspect 37, further comprising: transmitting, to the control node or the transmitter node, feedback associated with the repeater node pilots.

Aspect 39: The method of Aspect 38, wherein the feedback associated with the repeater node pilots indicates the channel estimate of the reception channel of the repeater node.

Aspect 40: The method of any of Aspects 38-38, further comprising: receiving, from the control node and at least in part on the feedback associated with the repeater node pilots, one or more of: an indication of scheduling for a subsequent communication, a reception configuration for the subsequent communication, information for beam management of one or more of a receive beam or a transmit beam of the repeater node, or an indication of an association of the repeater node with one or more wireless communication devices.

Aspect 41: The method of any of Aspects 37-40, further comprising: receiving, from the control node, an indication of a configuration of the first signal, wherein the feedback associated with the repeater node pilots is based at least in part on the configuration.

Aspect 42: The method of any of Aspects 37-41, wherein the second signal is an uplink communication or a downlink communication.

Aspect 43: The method of any of Aspects 37-42, wherein the first signal comprises one or more of: frequency-domain multiplexing of the repeater node pilots with the second signal, time-domain multiplexing of the repeater node pilots with the second signal, or repeater node pilots interleaved with the second signal in one or more of a time domain or a frequency domain.

Aspect 44: The method of any of Aspects 37-43, wherein reception of the first signal comprises one or more of: reception of the first signal using beamforming, or reception of the first signal using a millimeter wave frequency.

Aspect 45: The method of any of Aspects 37-45, wherein the control node comprises the transmitter node or the receiver node.

Aspect 46: An apparatus for wireless communication at a device, comprising a processor; memory coupled with the processor; and instructions stored in the memory and executable by the processor to cause the apparatus to perform the method of one or more of Aspects 1-45.

Aspect 47: A device for wireless communication, comprising a memory and one or more processors coupled to the memory, the one or more processors configured to perform the method of one or more of Aspects 1-45.

Aspect 48: An apparatus for wireless communication, comprising at least one means for performing the method of one or more of Aspects 1-45.

Aspect 49: A non-transitory computer-readable medium storing code for wireless communication, the code comprising instructions executable by a processor to perform the method of one or more of Aspects 1-45.

Aspect 50: A non-transitory computer-readable medium storing a set of instructions for wireless communication, the set of instructions comprising one or more instructions that, when executed by one or more processors of a device, cause the device to perform the method of one or more of Aspects 1-45.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of a" list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a receiver node, comprising:
    receiving, from a repeater node, a second signal that includes a first signal with repeater node pilots;
    determining, based at least in part on the repeater node pilots, a channel estimate of a transmission channel between the receiver node and the repeater node;

transmitting, to a control node, feedback indicating the channel estimate of the transmission channel between the receiver node and the repeater node; and receiving, from the control node and based at least in part on transmitting the channel estimate of the repeater node that is based at least in part on the repeater node pilots, one or more of:
an indication of scheduling for a subsequent communication from the repeater node, or
a transmission configuration for the subsequent communication from the repeater node.

2. The method of claim 1, further comprising:
receiving, from the control node, an indication of a configuration of the second signal,
wherein determination of the channel estimate is based at least in part on the configuration.

3. The method of claim 1, wherein the first signal comprises an uplink communication or a downlink communication.

4. The method of claim 1, wherein the second signal comprises one or more of:
frequency-domain multiplexing of the repeater node pilots with the first signal,
time-domain multiplexing of the repeater node pilots with the first signal, or
the repeater node pilots interleaved with the first signal in one or more of a time domain or a frequency domain.

5. The method of claim 1, wherein:
the first signal includes one or more pilots; and
receiving the second signal comprises receiving the one or more pilots within the first signal and receiving the repeater node pilots.

6. The method of claim 5, further comprising:
determining, based at least in part on the one or more pilots within the first signal, a second channel estimate of a second transmission channel between the repeater node and a transmitter node.

7. The method of claim 6, wherein the one or more pilots are inserted into the first signal by the transmitter node.

8. A receiver node for wireless communication, comprising:
one or more memories; and
one or more processors, coupled to the one or more memories, configured to:
receive, from a repeater node, a second signal that includes a first signal with repeater node pilots;
determine, based at least in part on the repeater node pilots, a channel estimate of a transmission channel between the receiver node and the repeater node;
transmit, to a control node, feedback indicating the channel estimate of the transmission channel between the receiver node and the repeater node; and
receive, from the control node and based at least in part on transmitting the channel estimate of the repeater node that is based at least in part on the repeater node pilots, one or more of:
an indication of scheduling for a subsequent communication from the repeater node, or
a transmission configuration for the subsequent communication from the repeater node.

9. The receiver node of claim 8, wherein the one or more processors are further configured to:
receive, from the control node, an indication of a configuration of the second signal,
wherein determination of the channel estimate is based at least in part on the configuration.

10. The receiver node of claim 8, wherein the first signal comprises an uplink communication or a downlink communication.

11. The receiver node of claim 8, wherein the second signal comprises one or more of:
frequency-domain multiplexing of the repeater node pilots with the first signal,
time-domain multiplexing of the repeater node pilots with the first signal, or
the repeater node pilots interleaved with the first signal in one or more of a time domain or a frequency domain.

12. The receiver node of claim 8, wherein:
the first signal includes one or more pilots; and
receiving the second signal comprises receiving the one or more pilots within the first signal and receiving the repeater node pilots.

13. A non-transitory computer-readable medium storing a set of instructions for wireless communication, the set of instructions comprising:
one or more instructions that, when executed by one or more processors of a receiver node, cause the receiver node to:
receive, from a repeater node, a second signal that includes a first signal with repeater node pilots;
determine, based at least in part on the repeater node pilots, a channel estimate of a transmission channel between the receiver node and the repeater node;
transmit, to a control node, feedback indicating the channel estimate of the transmission channel between the receiver node and the repeater node; and
receive, from the control node and based at least in part on transmitting the channel estimate of the repeater node that is based at least in part on the repeater node pilots, one or more of:
an indication of scheduling for a subsequent communication from the repeater node, or
a transmission configuration for the subsequent communication from the repeater node.

14. The non-transitory computer-readable medium of claim 11, wherein the one or more instructions further cause the receiver node to:
receive, from the control node, an indication of a configuration of the second signal,
wherein determination of the channel estimate is based at least in part on the configuration.

15. The non-transitory computer-readable medium of claim 13, wherein the first signal comprises an uplink communication or a downlink communication.

16. The non-transitory computer-readable medium of claim 13, wherein the second signal comprises one or more of:
frequency-domain multiplexing of the repeater node pilots with the first signal,
time-domain multiplexing of the repeater node pilots with the first signal, or
the repeater node pilots interleaved with the first signal in one or more of a time domain or a frequency domain.

17. An apparatus for wireless communication, comprising:
means for receiving, from a repeater node, a second signal that includes a first signal with repeater node pilots;
means for determining, based at least in part on the repeater node pilots, a channel estimate of a transmission channel between the apparatus and the repeater node;

means for transmitting, to a control node, feedback indicating the channel estimate of the transmission channel between the apparatus and the repeater node; and means for receiving, from the control node and based at least in part on transmitting the channel estimate of the repeater node that is based at least in part on the repeater node pilots, one or more of:
- an indication of scheduling for a subsequent communication from the repeater node, or
- a transmission configuration for the subsequent communication from the repeater node.

18. The apparatus of claim 17, further comprising:
means for receiving, from the control node, an indication of a configuration of the second signal,
wherein determination of the channel estimate is based at least in part on the configuration.

19. The apparatus of claim 17, wherein the first signal comprises an uplink communication or a downlink communication.

20. The apparatus of claim 17, wherein the second signal comprises one or more of:
- frequency-domain multiplexing of the repeater node pilots with the first signal,
- time-domain multiplexing of the repeater node pilots with the first signal, or
- the repeater node pilots interleaved with the first signal in one or more of a time domain or a frequency domain.

* * * * *